United States Patent
Zhou

(10) Patent No.: US 12,554,634 B2
(45) Date of Patent: Feb. 17, 2026

(54) MEMORY SYSTEMS AND OPERATION METHODS, ELECTRONIC APPARATUSES

(71) Applicant: YANGTZE MEMORY TECHNOLOGIES CO., LTD., Wuhan (CN)

(72) Inventor: Teng Zhou, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/825,930

(22) Filed: Sep. 5, 2024

(65) Prior Publication Data

US 2025/0335352 A1 Oct. 30, 2025

(30) Foreign Application Priority Data

Apr. 28, 2024 (CN) .......................... 202410525599.4

(51) Int. Cl.
| | |
|---|---|
| *G06F 12/00* | (2006.01) |
| *G06F 12/02* | (2006.01) |
| *G11C 16/04* | (2006.01) |
| *G11C 16/26* | (2006.01) |

(52) U.S. Cl.
CPC ...... *G06F 12/0246* (2013.01); *G11C 16/0483* (2013.01); *G11C 16/26* (2013.01)

(58) Field of Classification Search
CPC .. G06F 12/0246; G11C 16/0483; G11C 16/26
USPC ........................................................ 711/103
See application file for complete search history.

(56) References Cited

U.S. PATENT DOCUMENTS

2006/0291293 A1* 12/2006 Chae .................... G11C 16/349
365/185.23

FOREIGN PATENT DOCUMENTS

| | | | | |
|---|---|---|---|---|
| CN | 114639402 A | * | 6/2022 | ............. G11C 29/52 |
| TW | 202418087 A | * | 5/2024 | ........... G06F 3/0647 |

OTHER PUBLICATIONS

Bailon et al.; Read Reference VOltage Adaptation for NAND Flash Memories with Neural Networks Based on SParse Histograms; Jun. 6, 2023; IEEE Access (Year: 2023).*
Cai et al.; Error Characterization, Mitigation, and Recovery in Flash Memory Based Solid-State Drives; Date: Unknown; Carnegie Mellon Iniversity (Year: NA).*

* cited by examiner

*Primary Examiner* — Mardochee Chery
(74) *Attorney, Agent, or Firm* — Conley Rose, P.C.

(57) ABSTRACT

An example memory system includes: a memory device and a memory controller. The memory device includes L memory dies, and memory blocks in different memory dies form a super block. The memory controller is configured to: determine first super blocks among super blocks, and the state parameters of first super blocks match the preset state parameters; determine M first read voltages based on first super blocks and first mapping tables; adjust the M first read voltages corresponding to the memory blocks of each first super block to M second read voltages; determine M first equilibrium read voltages based on the equilibrium values of second read voltages corresponding to memory blocks located in the same memory die in first super blocks; and update the first mapping table based on M first equilibrium voltage readings.

20 Claims, 14 Drawing Sheets

MEMORY SYSTEMS AND OPERATION METHODS, ELECTRONIC APPARATUSES

CROSS-REFERENCE TO RELATED APPLICATIONS

The present application claims the benefit of priority to Chinese Patent Application No. 2024105255994, filed on Apr. 28, 2024, the content of which is incorporated herein by reference in its entirety.

TECHNICAL FIELD

The implementations of the present disclosure relate to the field of semiconductor technology, including but not limited to memory systems and methods of operating thereof, as well as electronic apparatuses.

BACKGROUND

A memory controller and a memory device (which may include a plurality of memory dies) can be integrated into various types of memory apparatuses, such as a solid-state drive (SSD), a universal flash storage (UFS), and an embedded multimedia card (eMMC). The memory controller can control the operation of the memory device, such as reading, writing, or erasing.

SUMMARY

According to a first aspect of the implementation of the present disclosure, there is provided a memory system including: a memory device including L memory dies, each of which includes a plurality of memory blocks; wherein a plurality of the memory blocks in different memory dies form a super block, and L is an integer greater than 1; and a memory controller coupled to the memory device and configured to: determine a plurality of first super blocks of a plurality of the super blocks; wherein state parameters of the plurality of first super blocks are matched with preset state parameters; determine M first read voltages based on the plurality of first super blocks and a first mapping table; wherein the first mapping table includes mapping entries between a plurality of memory blocks of each first super block and the M first read voltages, the M first read voltages respectively correspond to the memory blocks in each first super block and respectively in M memory dies, and M is a positive integer less than or equal to L; adjust M first read voltages respectively corresponding to a plurality of memory blocks of each first super block of the plurality of first super blocks to M second read voltages respectively; determine M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory blocks in the plurality of first super blocks and in the same memory die; and update the first mapping table based on the M first equilibrium read voltages.

According to a second aspect of the implementation of the present disclosure, there is provided a method of operating a memory system, wherein the method includes: determining a plurality of first super blocks of a plurality of super blocks; wherein state parameters of the plurality of first super blocks each are matched with preset state parameters; determining M first read voltages based on the plurality of first super blocks and a first mapping table; wherein the first mapping table includes mapping entries between a plurality of memory blocks of each first super block and the M first read voltages, wherein the M first read voltages respectively correspond to the memory blocks in each first super block and respectively in M memory dies; adjusting the M first read voltages respectively corresponding to the plurality of memory blocks of each first super block of the plurality of first super blocks to M second read voltages respectively; determining M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory block in the plurality of first super blocks and in the same memory die; and updating the first mapping table based on the M first equilibrium read voltages.

According to a third aspect of the implementation of the present disclosure, there is provided an electronic apparatus which includes: a memory system and a host coupled to the memory system. The memory system including: a memory device including L memory dies, each of which includes a plurality of memory blocks; wherein a plurality of the memory blocks in different memory dies form a super block, and L is an integer greater than 1; and a memory controller coupled to the memory device and configured to: determine a plurality of first super blocks of a plurality of the super blocks; wherein state parameters of the plurality of first super blocks are matched with preset state parameters; determine M first read voltages based on the plurality of first super blocks and a first mapping table; wherein the first mapping table includes mapping entries between a plurality of memory blocks of each first super block and the M first read voltages, the M first read voltages respectively correspond to the memory blocks in each first super block and respectively in M memory dies, and M is a positive integer less than or equal to L; adjust M first read voltages respectively corresponding to a plurality of memory blocks of each first super block of the plurality of first super blocks to M second read voltages respectively; determine M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory blocks in the plurality of first super blocks and in the same memory die; and update the first mapping table based on the M first equilibrium read voltages.

According to a fourth aspect of the implementation of the present disclosure, there is provided a computer-readable storage medium on which instructions are stored, when the instructions are executed by a processor, a method including the following operations is implemented: determining a plurality of first super blocks of a plurality of super blocks; wherein state parameters of the plurality of first super blocks each are matched with preset state parameters; determining M first read voltages based on the plurality of first super blocks and a first mapping table; wherein the first mapping table includes mapping entries between a plurality of memory blocks of each first super block and the M first read voltages, wherein the M first read voltages respectively correspond to the memory blocks in each first super block and respectively in M memory dies; adjusting the M first read voltages respectively corresponding to the plurality of memory blocks of each first super block of the plurality of first super blocks to M second read voltages respectively;

determining M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory block in the plurality of first super blocks and in the same memory die; and updating the first mapping table based on the M first equilibrium read voltages.

In the implementation of the present disclosure, the memory controller selects a plurality of first super blocks from a plurality of super blocks, whose state parameters match the preset state parameters, and then looks up the first mapping table to determine the first read voltages respectively corresponding to the memory blocks in each first super block and in M memory dies, thereby determining M first read voltages. Then, the M first read voltages are adjusted to M second read voltages, and the equilibrium values of a plurality of second read voltages respectively corresponding to a plurality of memory block in the same memory die are calculated to obtain M first equilibrium read voltages. The M first equilibrium read voltages are updated to the first mapping table to obtain optimized read voltages.

BRIEF DESCRIPTION OF THE DRAWINGS

In accompanying drawings, unless otherwise specified, the same reference numbers represent same or similar components or elements throughout a plurality of accompanying drawings. These accompanying drawings may not necessarily be drawn to scale. It should be understood that these accompanying drawings only depict some implementations disclosed in accordance with the present disclosure and should not be regarded as limiting the scope of the present disclosure.

DETAILED DESCRIPTION

Figure 1:
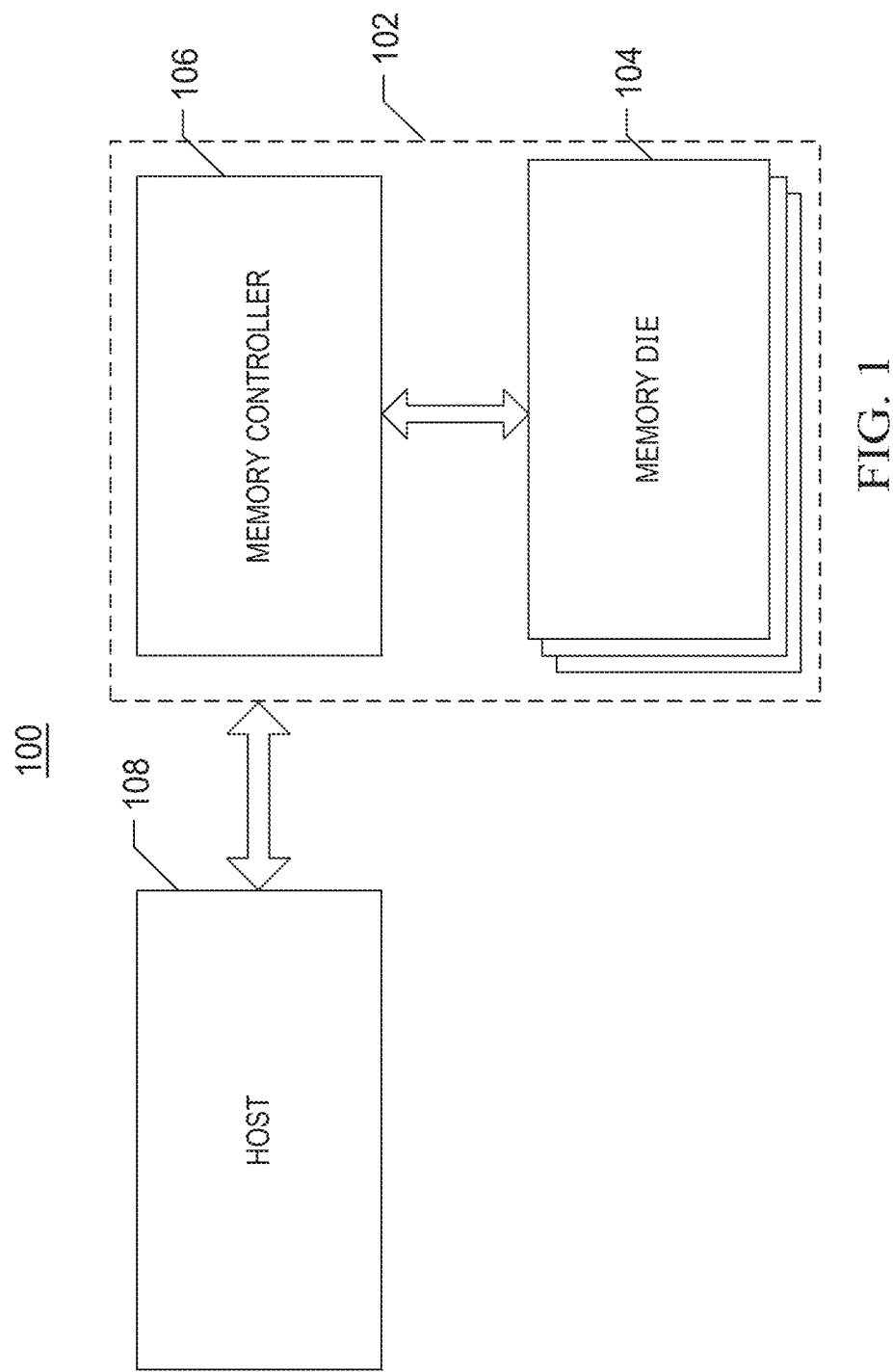
FIG. 1 is a schematic diagram of an electronic apparatus illustrated according to an implementation of the present disclosure.

For the convenience of understanding the present disclosure, example implementations of the present disclosure will be described in more detail below with reference to the relevant accompanying drawings. Although example implementations of the present disclosure are shown in the accompanying drawings, it should be understood that the present disclosure can be implemented in various forms and should not be limited by the specific implementations described herein. On the contrary, providing these implementation is to enable a more thorough understanding of the present disclosure and to fully convey the scope of the present disclosure to those skilled in the art.

In the following description, a large number of specific details are provided to provide a more thorough understanding of the present disclosure. However, it is apparent to those skilled in the art that the present disclosure can be implemented without one or more of these details. In some implementations, in order to avoid confusion with the present disclosure, some technical features commonly known in the art are not described; that is, it is possible not to describe all the features of the actual implementations, not to provide a detailed description of the well-known functions and structures.

Generally, terms can be understood at least partially from its use in context. For example, at least partially depending on the context, the term "one or more" used herein can be configured to describe any feature, structure, or characteristic in singular sense, or can be configured to describe a combination of features, structures, or characteristics in plural sense. Similarly, terms such as "a" or "the" can also be understood as conveying singular or plural usage, depending at least in part on the context. In addition, the term "based on" can be understood as not necessarily intended to convey an exclusive set of factors, and can alternatively allow for the existence of additional factors that may not be necessarily explicitly described, which again depends at least in part on the context.

Unless otherwise defined, the terms used herein are for the sole purpose of describing specific implementations and are not to limit the present disclosure. When used here, "an", "a", and "said/the" in singular form are also intended to include plural forms, unless the context clearly indicates otherwise. It should also be understood that at least one of the terms "consist of" or "include", when used in this description, determines the presence of at least one of said features, integers, steps, operations, elements, or components, but do not exclude the presence or addition of at least one of one or more other features, integers, steps, operations, elements, components, or groups. When used here, the term "at least one of" includes any and all combinations of related listed items.

In order to fully understand the present disclosure, detailed steps and structures will be proposed in the following description to state the technical solution disclosed herein. The example implementations of the present disclosure are described in detail below, however, in addition to these detailed descriptions, there may be other implementations of the present disclosure.

With the improvement of memory die integration and bit density, more data can be stored in the memory device. However, due to differences between a plurality of memory dies and differences between film layers at different positions in the same memory die, the quality of service (QoS) and performance of system products (such as the aforementioned memory apparatuses) are affected.

FIG. 1 is a schematic diagram of an electronic apparatus 100 illustrated according to an implementation of the present disclosure. The electronic apparatus 100 can be a mobile phone, a desktop computer, a laptop, a tablet, a vehicle computer, a game console, a printer, a positioning apparatus, a wearable electronic apparatus, a smart sensor, a virtual reality (VR) apparatus, an augmented reality (AR) apparatus, or any other suitable electronic apparatus with a memory device therein. As shown in FIG. 1, the electronic apparatus 100 may include a host 108 and a memory system 102 which has one or more memory dies 104 and a memory controller 106. The host 108 can be a processor of an electronic apparatus (such as a central processing unit (CPU)) or a system on chip (SoC) (such as an application process (AP)). The host 108 can be configured to send data to or receive data from the memory dies 104.

According to some implementations, the memory controller 106 is coupled to the memory dies 104 and the host 108, and is configured to control the memory dies 104. The memory controller 106 can manage the data stored in the memory dies 104 and communicate with the host 108. In some implementations, the memory controller 106 is designed to operate in low duty cycle environments, such as secure digital (SD) cards, compact flash (CF) cards, universal serial bus (USB) flash drives, or other media used in electronic apparatuses such as personal calculators, digital cameras, mobile phones, etc. In some implementations, the memory controller 106 is designed to operate in a high duty cycle environment, such as solid-state disks (SSDs) or embedded multimedia cards (eMMCs), and SSDs or eMMCs are used as data storage for mobile devices such as smartphones, tablets, laptops, and enterprise storage arrays.

The memory controller 106 can be configured to control the operations of the memory die 104, such as read, erase, and program operations. The memory controller 106 can also be configured to manage various functions related to data stored or to be stored in the memory die 104, including but not limited to bad block management, garbage collection, logical to physical address conversion, loss equilibrium, and so on. In some implementations, the memory controller 106 is also configured to process error correction codes (ECC) related to data read from or written to the memory die 104. The memory controller 106 can also perform any other suitable functions, such as formatting the memory die 104. The memory controller 106 can communicate with an external apparatus (such as the host 108 in FIG. 1) according to specific communication protocols. For example, the memory controller 106 can communicate with the external apparatus through at least one of various interface protocols, such as a USB protocol, an MMC protocol, a peripheral component interconnect (PCI) protocol, a PCI-express (PCI-E) protocol, an advanced technology attachment (ATA) protocol, a serial ATA protocol, a parallel ATA protocol, a small computer system interface (SCSI) protocol, an enhanced small disk interface (ESDI) protocol, an integrated drive electronics (IDE) protocol, a firewire protocol, etc.

Figure 2B:
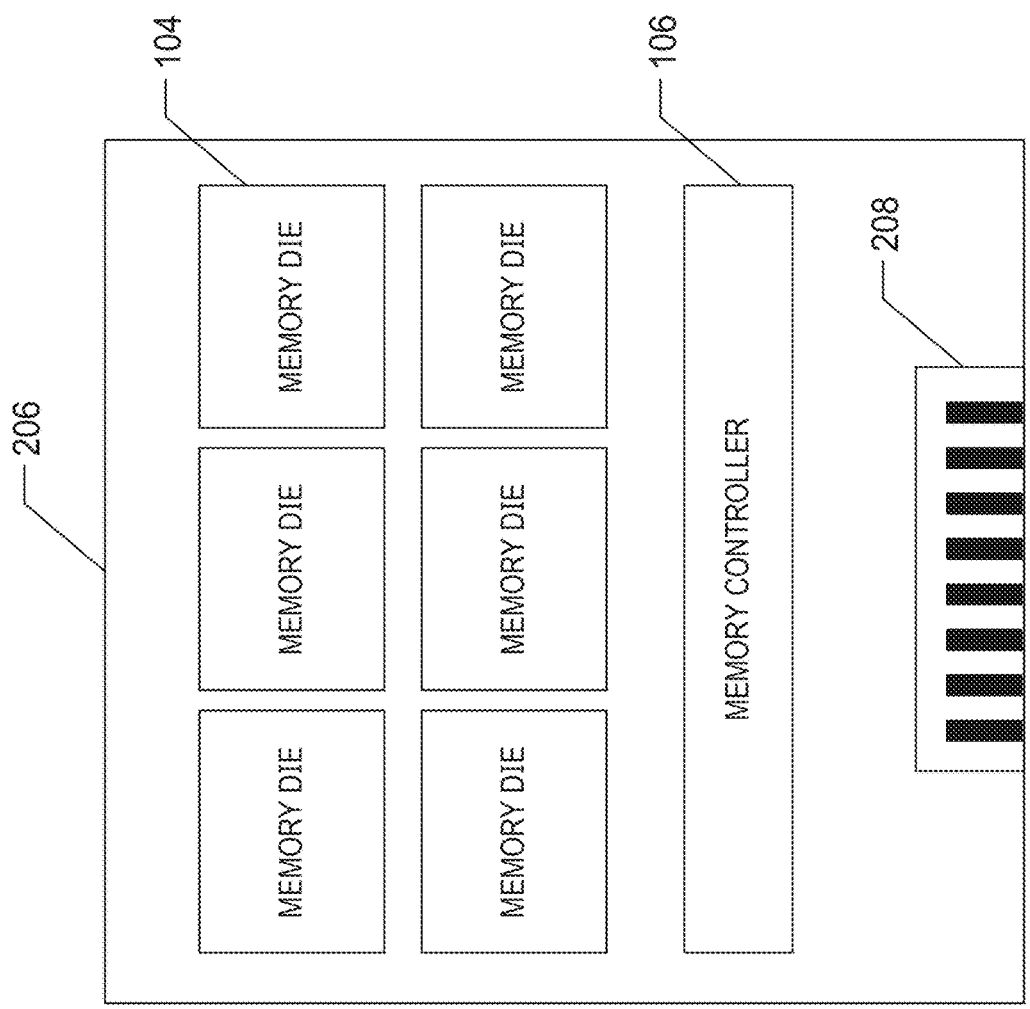
FIG. 2B is a schematic diagram of a solid-state drive illustrated according to an implementation of the present disclosure.
Figure 2A:
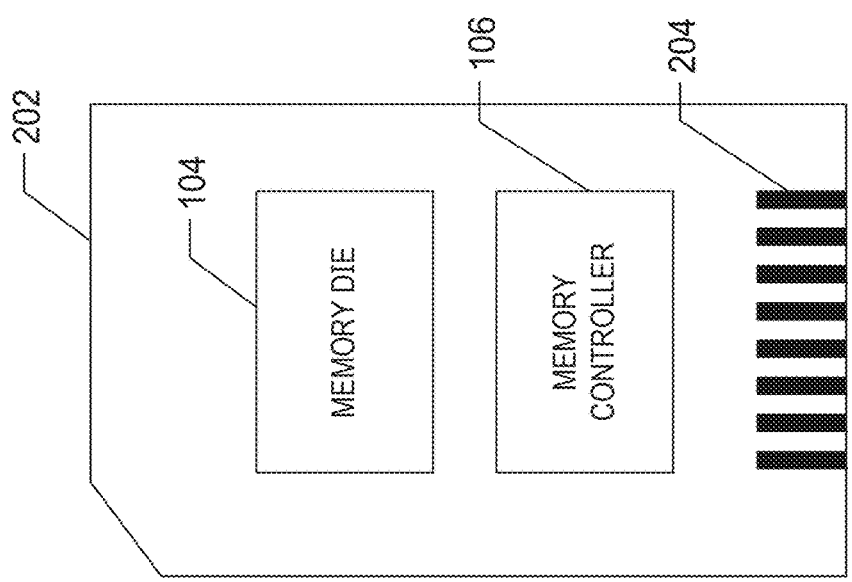
FIG. 2A is a schematic diagram of a memory card illustrated according to an implementation of the present disclosure.

The memory controller 106 and one or more memory dies 104 can be integrated into various types of memory apparatuses, for example, included in the same package (such as a universal flash storage (UFS) package or an eMMC package). That is to say, the memory system 102 can be implemented and packaged into different types of end electronic products. In an example shown in FIG. 2A, the memory controller 106 and a single memory die 104 can be integrated into the memory card 202. The memory card 202 can include a PC card (personal computer memory card), a CF card, a smart media (SM) card, a memory stick, a multimedia card (MMC (multi-media Card), RS-MMC (Reduced Size MMC), MMC micro), a SD card (SD, miniSD, microSD, SDHC (Reduced Size MMC)), UFS, etc. The memory card 202 may also include a memory card connector 204 that couples the memory card 202 with a host (e.g., the host 108 in FIG. 1). In another example shown in FIG. 2B, the memory controller 106 and a plurality of memory dies 104 can be integrated into the SSD 206. The SSD 206 may also include an SSD connector 208 that couples the SSD 206 with the host (such as the host 108 in FIG. 1). In some implementations, at least one of the storage capacity or operation speed of the SSD 206 is greater than those of the memory card 202.

Figure 3:
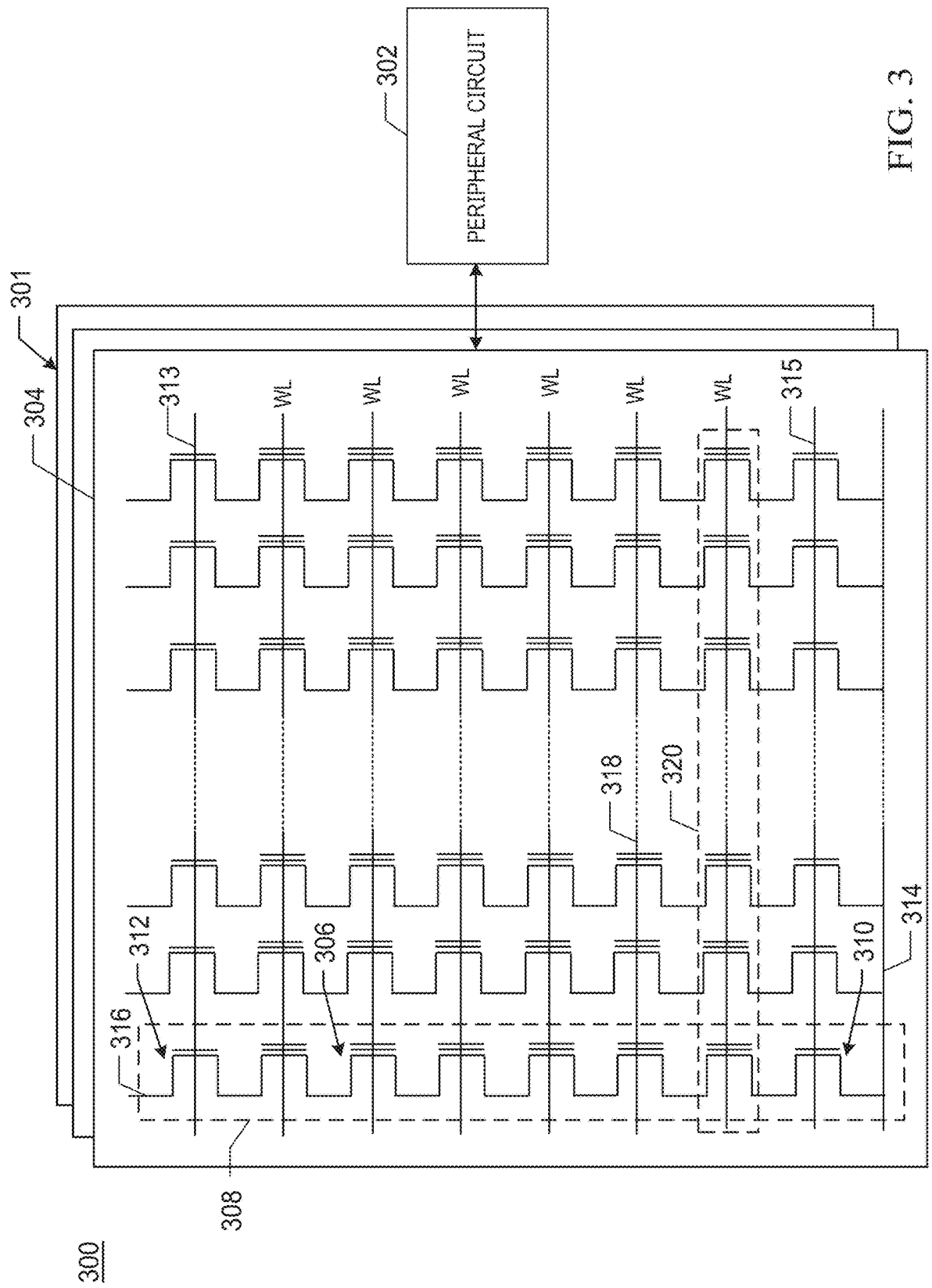
FIG. 3 is a schematic block diagram of a three-dimensional NAND memory die illustrated according to an implementation of the present disclosure.

FIG. 3 is a schematic block diagram of a three-dimensional NAND memory die 300 illustrated according to an implementation of the present disclosure. The memory die 300 can be an example of the memory die 104 in FIG. 1. The memory die 300 may include a memory cell array 301 and a peripheral circuit 302 coupled to the memory cell array 301. Taking the memory cell array 301 being a three-dimensional NAND memory cell array as an example, the memory cell 306 is provided in the form of an array of NAND memory strings 308, with each NAND memory string 308 extending vertically above the substrate (not shown). In some implementations, each NAND memory string 308 includes a plurality of memory cells 306 coupled in series and stacked vertically. Each memory cell 306 can maintain continuous analog values, such as a voltage or a charge, depending on the number of electrons captured in the region of the memory cell 306. Each memory cell 306 can be a floating gate type memory cell including a floating gate transistor, or a charge capture type memory cell including a charge capture transistor.

In some implementations, each memory cell 306 is a single level cell (SLC) having two possible memory states and thus capable of storing one bit of data. For example, the first memory state "0" can correspond to the first voltage range, and the second memory state "1" can correspond to the second voltage range. In some implementations, each memory cell 306 is a multi-level cell (MLC) capable of storing more than a single bit of data in more than four memory states. For example, MLC can store two bits per cell, three bits per cell (also known as a triple level cell (TLC)), or four bits per cell (also known as a quad level cell (QLC)). Each MLC can be programmed to take a range of possible nominal storage values. In one example, if each MLC stores two bits of data, the MLC can be programmed to write one of the three possible nominal storage values to the cell, and the fourth nominal storage value except for these three nominal storage values can be configured to represent an erase state.

As shown in FIG. 3, each NAND memory string 308 may include a bottom select gate (BSG) 310 at its source end and a top select gate (TSG) 312 at its drain end. The BSG 310 and the TSG 312 can be configured to activate a selected NAND memory string 308 during read and program operations. In some implementations, the sources of NAND memory strings 308 in a same memory block 304 are coupled through a same source line (SL) 314 (e.g., a common SL). For example, according to some implementations, all NAND memory strings 308 in the same memory block 304 have an array common source (ACS). According to some implementations, the TSG 312 of each NAND memory string 308 is coupled to a respective bit line (BL) 316 from which data can be read or written via an output bus (not shown). In some implementations, each NAND memory string 308 is configured to be selected or deselected by applying a selection voltage (e.g., above a threshold voltage of the transistor with the TSG 312) or a deselection voltage (e.g., 0V) to the respective TSG 312 through one or more TSG lines 313, and/or by applying a selection voltage (e.g., above a threshold voltage of the transistor with the BSG 310) or a deselection voltage (e.g., 0V) to the respective BSG 310 through one or more BSG lines 315.

As shown in FIG. 3, the NAND memory string 308 can be organized into a plurality of memory blocks 304 each of which can have a common source line 314 (e.g., coupled to the ground). In some implementations, each memory block 304 is the basic data unit used for an erase operation, that is, all memory cells 306 on the same memory block 304 are simultaneously erased. In order to erase the memory cells 306 in the selected memory block, an erase voltage (Vers), e.g., a high positive voltage (e.g., 20V or higher), can be configured to bias the source lines coupled to the selected memory block and unselected memory blocks in the same plane as the selected memory block. It should be understood that, in some examples, erase operations can be performed at a half memory block level, at a quarter memory block level, or at a level having any appropriate number of memory blocks or any appropriate fraction of a memory block. The memory cells 306 of adjacent NAND memory strings 308 can be coupled through a word line 318, which selects which row of the memory cells 306 is affected by read and program operations. In some implementations, the memory cells 306 coupled to a same word line 318 in the memory block 304 may form at least one physical page. Each word line 318 may include a plurality of control gates (gate electrodes) at each memory cell 306 of the respective physical page, as well as a gate line coupled with the control gates.

Figure 4:
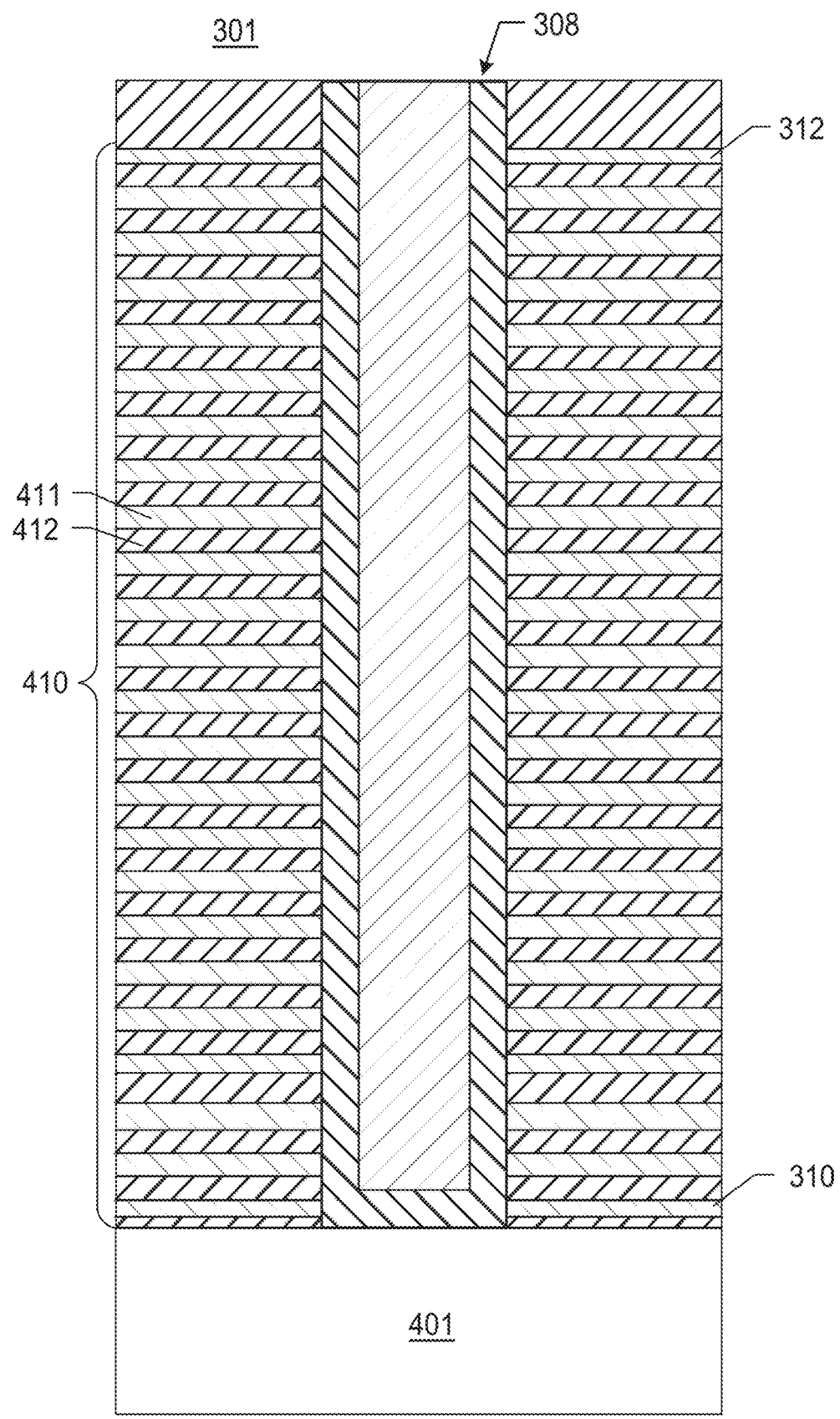
FIG. 4 is a cross-sectional schematic diagram of a memory die illustrated according to an implementation of the present disclosure.

FIG. 4 is a cross-sectional schematic diagram of a memory die illustrated according to the implementation of the present disclosure. As shown in FIG. 4, the NAND memory string 308 may include a stacked structure 410, which includes a plurality of gate layers 411 and a plurality of insulation layers 412 stacked alternately in sequence, as well as a memory string 308 that vertically penetrates through the gate layers 411 and the insulation layers 412. The gate layers 411 and the insulation layers 412 can be alternately stacked, and two adjacent gate layers 411 are separated by a layer of insulation layer 412. The number of pairs of gate layer 411 and insulation layer 412 in the stacked structure 410 can determine the number of memory cells included in the memory cell array 301.

The composition material of the gate layer 411 may include a conductive material. The conductive material includes, but is not limited to tungsten (W), cobalt (Co), copper (Cu), aluminum (Al), polycrystalline silicon, doped silicon, silicide, or any combination thereof. In some implementations, each gate layer 411 includes a metal layer, such as a tungsten layer. In some implementations, each gate layer 411 includes a doped polycrystalline silicon layer. Each gate layer 411 may include a control gate surrounding the memory cell. The gate layer 411 at the top of the stacked structure 410 can extend laterally as the top selection gate line, the gate layer 411 at the bottom of the stacked structure 410 can extend laterally as the bottom selection gate line, and the gate layer 411 extending laterally between the top selection gate line and the bottom selection gate line can be used as a word line layer.

In some implementations, the stacked structure 410 may be provided on the substrate 401. The substrate 401 may include silicon (e.g., monocrystalline silicon), silicon germanium (SiGe), gallium arsenide (GaAs), germanium (Ge), silicon on insulator (SOI), germanium on insulator (GOI), or any other suitable material.

In some implementations, the NAND memory string 308 includes a channel structure that extends vertically through the stacked structure 410. In some implementations, the channel structure includes a channel hole filled with a semiconductor material(s) (e.g., as the semiconductor channel) and a dielectric material(s) (e.g., as the memory film). In some implementations, the semiconductor channel includes silicon, such as polycrystalline silicon. In some implementations, the memory film is a composite dielectric layer including a tunneling layer, a storage layer (also known as a "charge capture/storage layer"), and a block layer. The channel structure can have a cylindrical shape (for example, a pillar shape). According to some implementations, the semiconductor channel, the tunneling layer, the storage layer, and the block layer are arranged radially from the center of the pillar towards the outer surface of the pillar in this order. The tunneling layer may include silicon oxide, silicon oxynitride, or any combination thereof. The storage layer may include silicon nitride, silicon oxynitride, or any combination thereof. The block layer may include silicon oxide, silicon oxynitride, high dielectric constant (high k) dielectric, or any combination thereof. In one example, the memory film may include a composite layer of silicon oxide/nitrogen oxide/silicon oxide (ONO).

Figure 5:
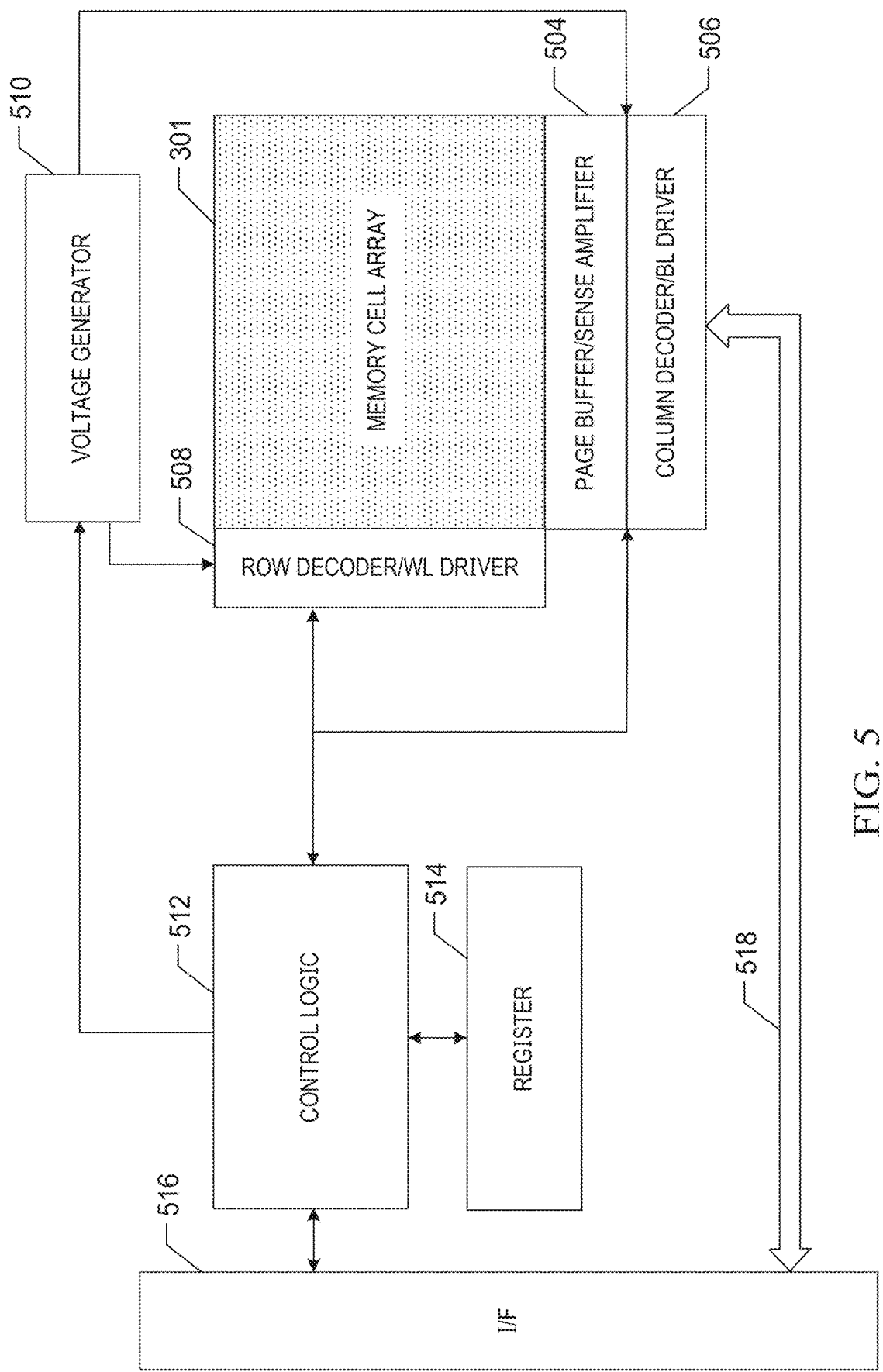
FIG. 5 is a schematic diagram of a memory cell array and a peripheral circuit in a memory die according to an implementation of the present disclosure.

Referring back to FIG. 3, the peripheral circuit 302 can be coupled to the memory cell array 301 through the bit line 316, the word line 318, the source line 314, the BSG line 315, and the TSG line 313. The peripheral circuit 302 may include any suitable analog, digital, and mixed signal circuits for promoting the operation of the memory cell array 301 by applying at least one of a voltage or current signal to each target memory cell 306 via the bit line 316, the word line 318, the source line 314, the BSG line 315, and the TSG line 313, and sensing at least one of a voltage or current signal from each target memory cell 306. The peripheral circuit 302 may include various types of peripheral circuits formed using metal oxide semiconductor (MOS) technology. For example, FIG. 5 illustrates some example peripheral circuits, the peripheral circuit 302 including a page buffer/sensing amplifier 504, a column decoder/bit line driver 506, a row decoder/word line driver 508, a voltage generator 510, a control logic 512, a register 514, an interface 516, and a data bus 518. It should be understood that, in some examples, additional peripheral circuits not shown in FIG. 5 may also be included.

The page buffer/sensing amplifier 504 can be configured to read data from the memory cell array 301 and program (write) data to the memory cell array 301 according to a control signal from the control logic 512. In one example, the page buffer/sensing amplifier 504 can store one page of programmed data (written data) to be programmed into a physical page of the memory cell array 301. In another example, the page buffer/sensing amplifier 504 can perform a program verification operation to ensure that the data has been correctly programmed into the memory cell 306 coupled to the selected word line 318. In another example, the page buffer/sensing amplifier 504 may also sense a low-power signal representing data bits stored in the memory cell 306 from the bit line 316, and amplify a small voltage swing to a recognizable logic level during the read operation. The column decoder/bit line driver 506 can be configured to be controlled by the control logic 512 and select one or more NAND memory strings 308 by applying a bit line voltage generated from the voltage generator 510.

The row decoder/word line driver 508 can be configured to be controlled by the control logic 512 and select/deselect the memory block 304 of the memory cell array 301 and select/deselect the word line 318 of the memory block 304. The row decoder/word line driver 508 can also be configured to drive the word line 318 using a word line voltage generated from the voltage generator 510. In some implementations, the row decoder/word line driver 508 may also select/deselect and drive the BSG line 315 and the TSG line 313. As described in detail below, the row decoder/word line driver 508 is configured to perform a program operation on the memory cells 306 coupled to the selected word line(s) 318. The voltage generator 510 can be configured to be controlled by the control logic 512 and generate the word line voltage (such as a read voltage, a program voltage, a pass voltage, a channel boost voltage, a verification voltage, etc.), a bit line voltage, and a source line voltage to be supplied to memory cell array 301.

The control logic 512 can be coupled to each peripheral circuit described above and configured to control the operation of each peripheral circuit. The register 514 can be coupled to the control logic 512 and includes a status register, a command register, and an address register for storing status information, command operation codes (OP codes), and command addresses for controlling the operation of each peripheral circuit. The interface 516 can be coupled to the control logic 512 and act as a control buffer to buffer control commands received from the host (not shown) and relay them to the control logic 512, as well as to buffer status information received from the control logic 512 and relay it to the host. The interface 516 can also be coupled to the column decoder/bit line driver 506 via the data bus 518 and act as a data I/O interface and a data buffer to buffer and relay data to the memory cell array 301 or buffer or relay data from the memory cell array 301.

With the increase in the number of 3D NAND stack layers and the improvement of performance requirements, the differences among a plurality of memory dies (such as a plurality of memory dies manufactured on the same wafer or a plurality of memory dies manufactured in different batches) are becoming larger and larger, and the differences between film layers at different positions in the same memory die (such as a plurality of word lines stacked in a vertical direction of the 3D NAND) are also becoming larger and larger, which has a greater and greater impact on the service quality and performance of a system product (especially an enhanced SSD (eSSD)). Especially in reliability scenarios such as durability and retention, the impact on the service quality and performance of the system product is further highlighted. It should be noted that the memory dies in the implementation of the present disclosure include, but are not limited to three-dimensional NAND memory dies. For ease of understanding, three-dimensional NAND memory dies will be used as examples for explanation.

In order to reduce the impact of the above differences on the service quality and performance of the system product, 3D NAND may be corrected and adjusted before leaving a factory. The following will provide an example explanation of the correction and adjustment of operation parameters such as the program voltage, the verification voltage, and the read voltage.

Taking the program voltage as an example, $V_{PGM\_start} = V_{pgm\_init} + V_{WL\_section\_offset} + V_{ISPP} + V_{TCO} + V_{feature\_offset}$; wherein $V_{PGM\_start}$ is a corrected and adjusted program voltage, $V_{pgm\_init}$ is an initial program voltage of the memory die, $V_{WL\_section\_offset}$ is a word line-program voltage offset, $V_{ISPP}$ is a step increment-program voltage offset, $V_{TCO}$ is a temperature-program voltage offset, and $V_{feature\_offset}$ is a special mode-program voltage offset. It can be understood that when the program voltage being corrected and adjusted, factors that need to be considered include, but are not limited to differences in memory dies, word lines, step increments, temperatures, modes, etc. Here, the parameter $V_{feature\_offset}$ that needs to be considered in a special mode is an example and not necessary.

Taking the verification voltage as an example, $V_{PV} = V_{pv\_init} + V_{TCO} + V_{plane\_offset}$; wherein $V_{PV}$ is a corrected and adjusted verification voltage, $V_{pv\_init}$ is an initial verification voltage of the memory die, $V_{TCO}$ is a temperature-verification voltage offset, and $V_{plane\_offset}$ is a memory plane-verification voltage offset. It can be understood that when the verification voltage is corrected and adjusted, factors that need to be considered include, but are not limited to differences in memory die, temperature, memory plane, etc.

Taking the read voltage as an example, $V_{RD} = V_{rd\_init} + V_{dvrd\_offset} + V_{TCO} + V_{plane\_offset} + V_{feature\_offset}$; wherein $V_{RD}$ is a corrected and adjusted read voltage, $V_{rd\_init}$ is an initial read voltage of the memory die, $V_{dvrd\_offset}$ is a word line-read voltage offset, $V_{TCO}$ is a temperature-read voltage offset, $V_{plane\_offset}$ is a memory plane-read voltage offset, and $V_{feature\_offset}$ is a special mode-read voltage offset. It can be understood that when the read voltage is corrected and adjusted, factors that need to be considered include, but are not limited to differences in memory dies, word lines, memory planes, modes, etc. Here, the parameter $V_{feature\_offset}$ that needs to be considered in a special mode is an example and not necessary.

The correction and adjustment of the above operation parameters is correction and adjustment optimization aimed at all samples (e.g., test dies), but not all factory memory dies, and mainly aimed at the initial stable state of fresh samples (with very few erases). This correction and adjustment optimization is far from sufficient throughout the entire lifecycle of the system product, especially in reliability scenarios such as durability and retention, where the impact on the uniformity and stability of service quality and performance of the system product is more significant.

Figure 6:
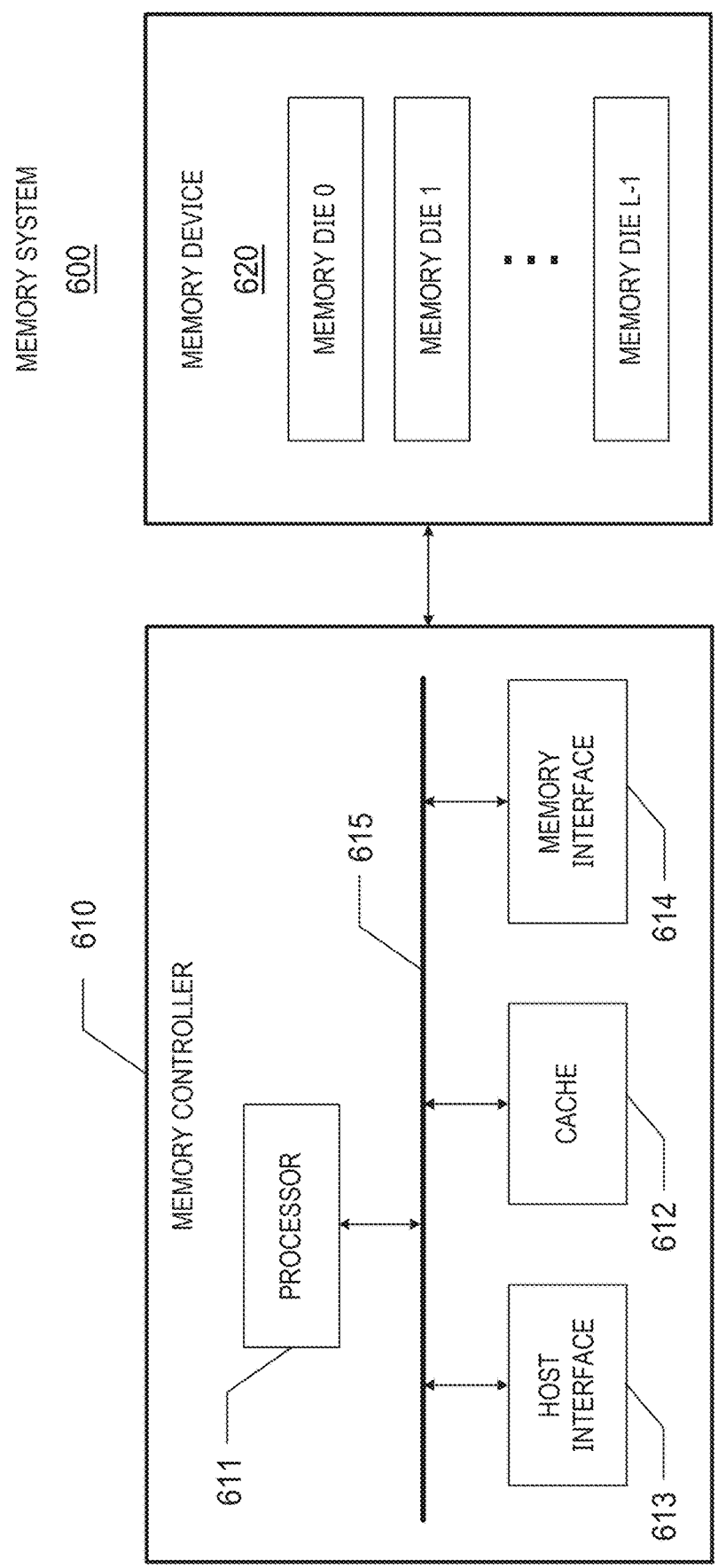
FIG. 6 is a schematic diagram of a memory system illustrated according to an implementation of the present disclosure.
Figure 7:
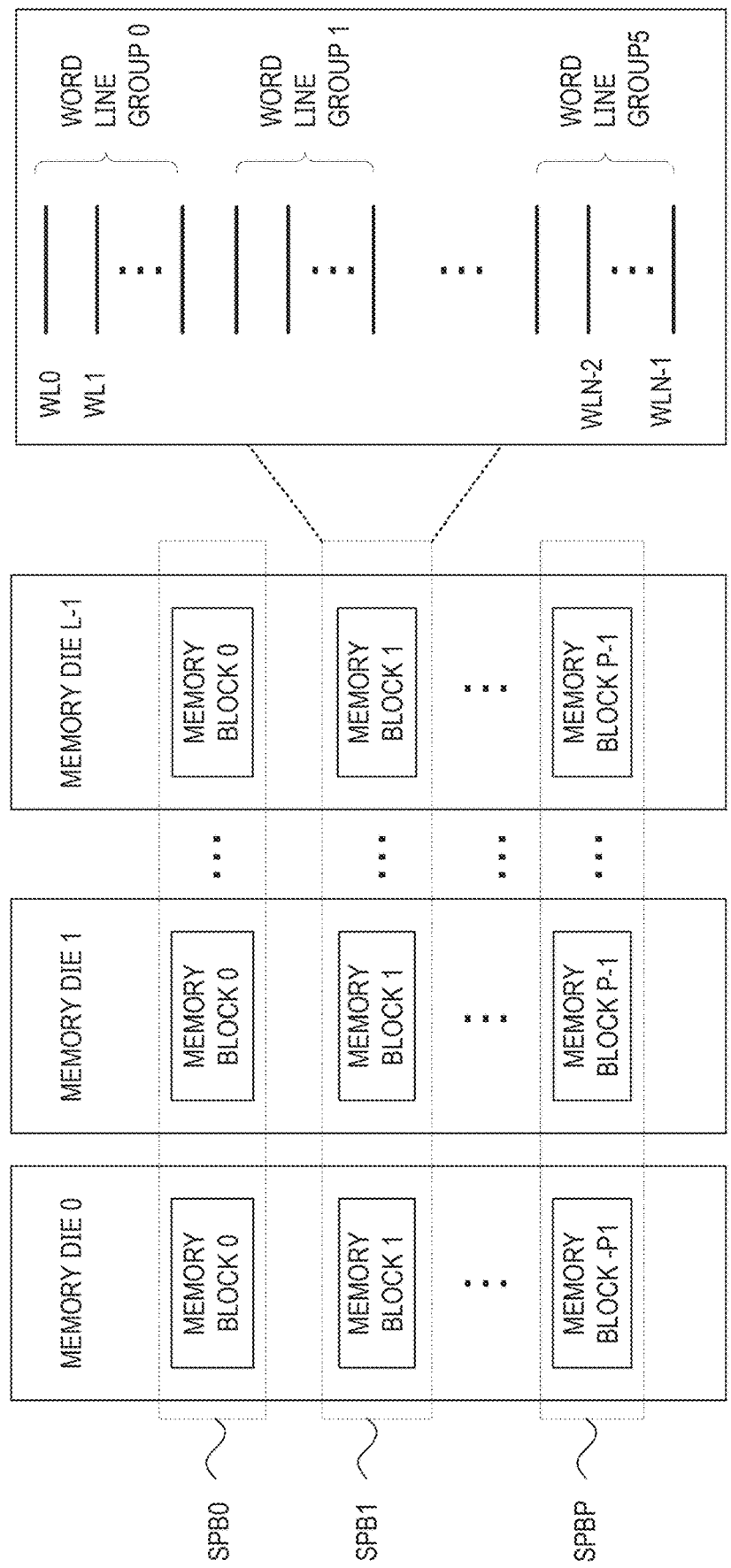
FIG. 7 is a schematic diagram of a memory die, a memory block, a super block, and a word line group in a memory device illustrated according to an implementation of the present disclosure.

Based on one or more of the aforementioned technical problems, an implementation of the present disclosure provides a memory system. FIG. 6 is a schematic diagram of a memory system illustrated according to an implementation of the present disclosure, and FIG. 7 is a schematic diagram of a memory die, a memory block, a super block, and a word line group in a memory device illustrated according to an implementation of the present disclosure. An example explanation of the memory system provided in the implementation of the present disclosure will be provided in the following in conjunction with FIGS. 6 and 7.

As shown in FIG. 6, the memory system 600 includes a memory controller 610 and a memory device 620 coupled to the memory controller 610, and the memory controller 610 can be coupled to the memory device 620 in any suitable manner. The memory controller 610 includes a processor 611, a cache 612, a host interface 613, a memory interface 614, and the like. Of course, the memory controller 610 may also include other circuits or modules not shown.

In some implementations, the host interface 613 outputs requests, data, etc. received from the host (e.g., the host 108 in FIG. 1) to an internal bus, and sends data read from the memory device 620 and responses from the processor 611, etc. to the host. The memory interface 614 controls the processing of writing data to the memory device 620 and reading data from the memory device 620 based on the instructions of the processor 611. The processor 611 controls the memory system 600 as a whole, and the processor 611 is for example a central processor unit, micro-processor unit (MPU), etc. The processor 611 performs control based on a request received from the host via a host interface 613. For example, the processor 611 instructs the memory interface 614 to write data to the memory device 620 based on a write request from the host. In addition, the processor 611 instructs the memory interface 614 to read data from the memory device 620 based on a read request from the host.

It should be noted that the processor 611 described in the implementation of the present disclosure may include a plurality of functional modules, each of which can be a software module running on a processor (such as a micro-controller unit (MCU)) that is a part of the processor 611, or a hardware module of a finite state machine (FSM) (such as an integrated circuit (IC, such as a dedicated IC (ASIC), a field programmable gate array (FPGA), etc.), or a combination of the software module and the hardware module.

In some implementations, the memory controller 610 is configured to perform a mapping management of the data stored in the memory device 620. In an example, the memory controller 610 can update and maintain an L2P table, wherein each mapping entry in the L2P table can represent a mapping relationship between a logical address and a physical address. When the host sends a read request including a logical address to the memory controller 610, the memory controller 610 can obtain the corresponding physical address based on the L2P table and the logical address in the read request, and read data from the memory device 620 based on the physical address and send it to the host.

In some implementations, the memory controller 610 includes a cache 612, which may include, but is not limited to a static random-access memory (SRAM), and the memory system 600 also includes a memory for storing the L2P table, such as a dynamic random-access memory (DRAM). The memory controller 610 can quickly obtain the L2P table from the DRAM, thereby achieving a higher read efficiency. The DRAM can be provided inside or outside the memory controller 610. Of course, in other implementations, the memory system 600 may be DRAM-less type, and the L2P table may be stored in a three-dimensional NAND memory. When the memory system 600 is powered on, at least a part of the L2P table is loaded into the cache 612 in the memory controller 610.

The memory device 620 includes L memory dies, which are respectively memory die 0, memory die 1, . . . , and memory die L−1, wherein L is an integer greater than 1. It can be understood that, when L is 2, the memory device 620 includes two memory dies, respectively memory die 0 and memory die 1. Each memory die includes a plurality of memory blocks. For example, FIG. 7 shows that each memory die includes P memory blocks, which are respectively memory block 0, memory block 1, . . . , memory block P−1, wherein P is an integer greater than 1. It can be understood that when P is 2, each memory die includes 2 memory blocks, respectively memory block 0 and memory block 1.

The memory controller 610 can manage a plurality of memory blocks in the memory device 620. In an example, the controller can group a plurality of memory blocks in different memory dies into one super block, e.g., a plurality of memory blocks in different memory dies form one super block. For example, as shown in FIG. 7, the memory blocks 0 in all of the memory dies constitute a super block SPB0, the memory blocks 1 in all of the memory dies constitute a super block SPB1, . . . , and the memory blocks P−1 in all of the memory dies constitute a super block SPBP−1. It should be noted that it is only an example that the memory blocks with the same number inside all of the memory dies shown in FIG. 7 constitute a super block, and the grouping way of the super block is not limited thereto, and other ways known in the art can also be used.

In some implementations, the memory controller 610 is configured to: determine a plurality of first super blocks of a plurality of the super blocks; wherein state parameters of the plurality of first super blocks are matched with preset state parameters; determine M first read voltages based on the plurality of first super blocks and a first mapping table; wherein the first mapping table includes mapping entries between a plurality of memory blocks of each first super block and the M first read voltages, the M first read voltages respectively correspond to the memory blocks in each first super block and respectively in M memory dies, and M is a positive integer less than or equal to L; adjust M first read voltages respectively corresponding to a plurality of memory blocks of each first super block of the plurality of first super blocks to M second read voltages respectively; determine M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory blocks in the plurality of first super blocks and in the same memory die; and update the first mapping table based on the M first equilibrium read voltages.

Figure 8:
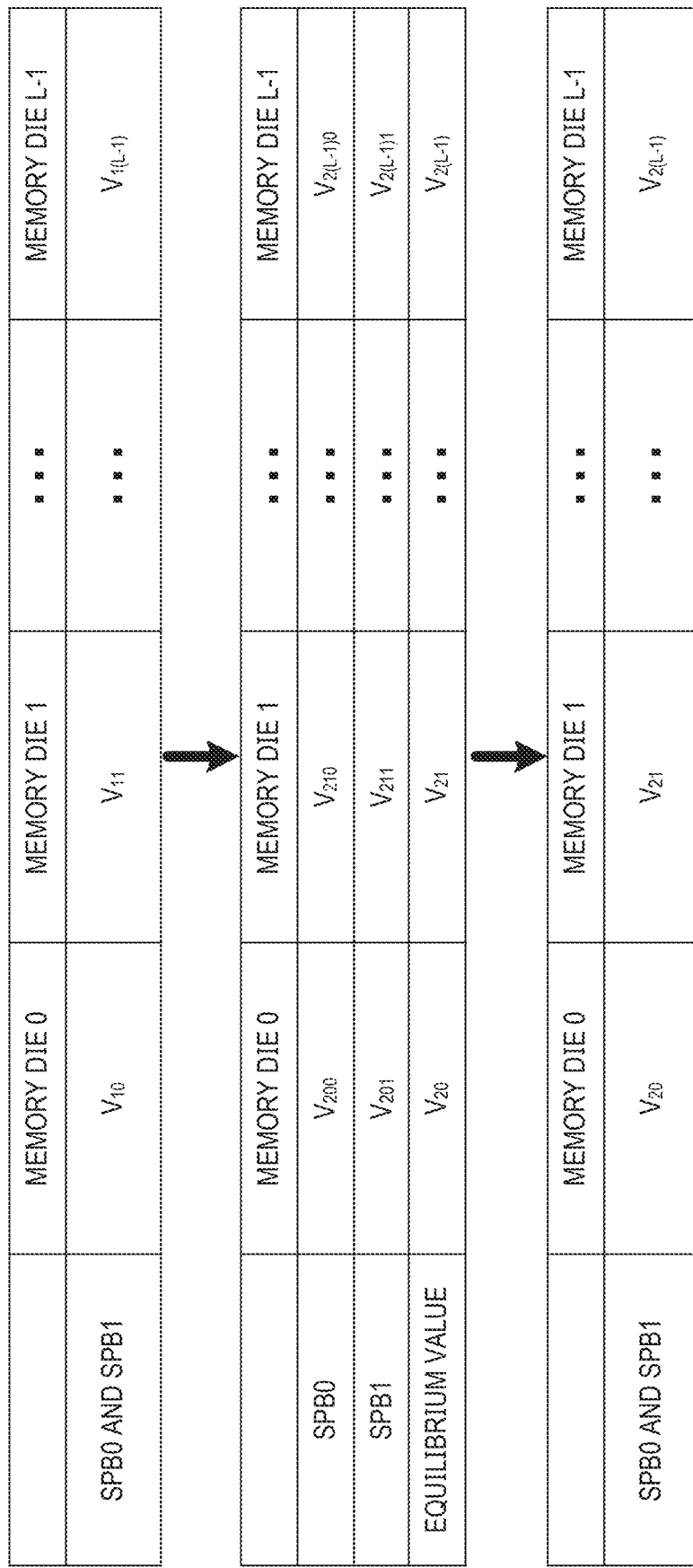
FIG. 8 is a schematic diagram of respectively adjusting M first read voltages to M first equilibrium read voltages illustrated according to an implementation of the present disclosure.

Table 1 is a schematic diagram of a first mapping table according to an implementation of the present disclosure, while FIG. 8 is a schematic diagram of respectively adjusting M first read voltages to M first equilibrium read voltages according to the present disclosure implementation. For ease of understanding, FIG. 8 only shows two first super blocks (e.g., SPB0 and SPB1), each of which includes memory blocks respectively in L memory dies (e.g., M equals L). However, the number of first super blocks and the grouping way of first super blocks are not limited thereto. In the following, two first super blocks will be used as examples and illustrated in conjunction with Table 1 and FIG. 8.

As shown in Table 1, the first mapping table includes a plurality of sub mapping tables, which are rr_0_M_N, rr_1_M_N, . . . , and rr_23_M_N, respectively. For example, if both of the erase numbers of SPB0 and SPB1 are less than PE_1, and both of the data retention times of SPB0 and SPB1 are less than t1, then the sub mapping table in the first mapping table corresponding to SPB0 and SPB1 is rr_0_M_N. In this example, the preset state parameter can be that the erase number of the super block is less than PE_1 and the data retention times of the super blocks are both less than t1. Of course, in other examples, the preset state parameters can be at least one of other erase number intervals PE range (e.g., [PE_1, PE_2), [PE_2, PE_3) or ≥PE_3), or other data retention time intervals Retention (e.g., [t1, t2), [t2, t3), [t3, t4), [t4, t5), or [t5, t6)), shown in Table 1. When the preset state parameters change, the memory controller 610 can determine the first super blocks that matches the changed preset state parameters by obtaining the state parameters respectively corresponding to a plurality of super blocks, e.g., determining the plurality of first super blocks of the plurality of super blocks as described above. Although Table 1 shows 4 erase number intervals and 6 data retention time intervals, in practical applications, erase number intervals and data retention time intervals can be divided according to the actual situation of the memory dies, and the present disclosure is not limited thereto. Here, the state parameters include at least one of the erase number and the data retention time.

TABLE 1

Schematic diagram 1 of the first mapping table

| | | | Retention | | | |
|---|---|---|---|---|---|---|
| PE range | <t1 | [t1, t2) | [t2, t3) | [t3, t4) | [t4, t5) | [t5, t6) |
| <PE_1 | rr_0_M_N | rr_1_M_N | rr_2_M_N | rr_3_M_N | rr_4_M_N | rr_5_M_N |
| [PE_1, PE_2) | rr_6_M_N | rr_7_M_N | rr_8_M_N | rr_9_M_N | rr_10_M_N | rr_11_M_N |
| [PE_2, PE_3) | rr_12_M_N | rr_13_M_N | rr_14_M_N | rr_15_M_N | rr_16_M_N | rr_17_M_N |
| ≥PE_3 | rr_18_M_N | rr_19_M_N | rr_20_M_N | rr_21_M_N | rr_22_M_N | rr_23_M_N |

The sub mapping table rr_0_M_N in the first mapping table includes M mapping entries. One of the M mapping entries is configured to record the mapping relationship between a memory block in one memory die and one first read voltage. The memory controller 610 can determine the first read voltage corresponding to a memory block in one memory die by looking up the first mapping table (specific looking up the sub mapping table rr_0_M_N), thereby determining M first read voltages. For example, as shown in FIGS. 7 and 8, the memory controller 610 can determine the first read voltages corresponding to the memory blocks in each memory die by looking up the sub mapping table rr_0_M_N, thereby determining L first read voltages, which are $V_{10}, V_{11}, \ldots, V_{1(L-1)}$ respectively. It can be understood that since the state parameters of both SPB0 and SPB1 match the preset state parameters, the first read voltages corresponding to a plurality of memory blocks in SPB0 and SPB1 and in the same memory die are the same. For example, both of the memory block 0 and the memory block 1 in SPB0 and SPB1 and in the memory die 0 correspond to the first read voltage $V_{10}$, both of the memory block 0 and the memory block 1 in SPB0 and SPB1 and in the memory die 1 correspond to the first read voltage $V_{11}, \ldots$, the memory block 0 and the memory block 1 in SPB0 and SPB1 and in the memory die L−1 correspond to the first read voltage $V_{1(L-1)}$.

The memory controller 610 can adjust the L first read voltages respectively corresponding to a plurality of memory blocks of each first super block to L second read voltages respectively. For example, as shown in FIG. 8, the memory controller 610 can adjust the L first read voltages $V_{10}, V_{11}, \ldots, V_{1(L-1)}$ respectively corresponding to the L memory blocks 0 of SPB0 to L second read voltages $V_{200}, V_{210}, \ldots, V_{2(L-1)0}$ respectively, and adjust the L first read voltages $V_{10}, V_{11}, \ldots, V_{1(L-1)}$ respectively corresponding to the L memory blocks 1 of SPB1 to L second read voltages $V_{201}, V_{211}, \ldots, V_{2(L-1)1}$ respectively. Here, the second read voltage and the corresponding first read voltage may be the same or different, for example, $V_{200}$ and $V_{10}$ may be the same or different, and the second read voltages respectively corresponding to the plurality of memory blocks in the same memory die may be the same or different, for example, $V_{200}$ and $V_{201}$ may be the same or different.

The memory controller 610 can determine M first equilibrium read voltages based on the equilibrium values of the plurality of second read voltages respectively corresponding to the plurality of memory blocks in the plurality of first super blocks and in the same memory die. For example, as shown in FIG. 8, the memory controller 610 can determine the first equilibrium read voltage $V_{20}$ based on the equilibrium values of the second read voltage $V_{200}$ and the second read voltage $V_{201}$ respectively corresponding to the memory block 0 and the memory block 1 in the memory die 0, determine the first equilibrium read voltage $V_{21}$ based on the equilibrium values of the second read voltage $V_{210}$ and the second read voltage $V_{211}$ respectively corresponding to the memory block 0 and memory block 1 in the memory die 1, ..., and determine the first equilibrium read voltage $V_{2(L-1)}$ based on the equilibrium values of the second read voltage $V_{2(L-1)0}$ and the second read voltage $V_{2(L-1)1}$ respectively corresponding to the memory block 0 and the memory block 1 in the memory die L−1.

The memory controller 610 can update the first mapping table based on the M first equilibrium read voltages. In an example, the M first read voltages in the first mapping table are updated to the M first equilibrium read voltages. For example, as shown in FIG. 8, the memory controller 610 can update L first read voltages $V_{10}, V_{11}, \ldots, V_{1(L-1)}$ to L first equilibrium read voltages $V_{20}, V_{21}, \ldots, V_{2(L-1)}$ respectively. The first equilibrium read voltage $V_{20}$ can be used as the optimized read voltage for the memory block 0 and the memory block 1 in the memory die 0, the first equilibrium read voltage $V_{21}$ can be used as the optimized read voltage for the memory block 0 and the memory block 1 in the memory die 1, ..., the first equilibrium read voltage $V_{2(L-1)}$ can be used as the optimized read voltage for the memory block 0 and the memory block 1 in the memory die L−1.

It should be noted that the above determination of the first equilibrium read voltage can be to calculate an average of a plurality of second read voltages respectively corresponding to a plurality of memory blocks in the same memory die, and obtain the corresponding first equilibrium read voltage; and it can also be to assign different weights to the plurality of second read voltages respectively corresponding to the plurality of memory blocks in the same memory die, and calculate the corresponding first equilibrium read voltage through weighted averaging. Of course, other statistical ways known in this field can also be used, and the first equilibrium read voltage is configured to comprehensively reflect the overall situation of the plurality of memory blocks in the same memory die.

In practical applications, the above similar steps can be performed a plurality of times throughout the entire lifecycle of a memory system. In an example, it can be initiated by the memory controller 610 itself to reduce the impact of differences between different memory dies on the service quality and performance of the memory system. Furthermore, the memory controller 610 can be initiated in background processes (e.g., when the memory system is idle) to reduce firmware overhead.

In an implementation of the present disclosure, the memory controller 610 selects a plurality of first super blocks from a plurality of super blocks whose state parameters each match the preset state parameters. By looking-up the first mapping table, the first read voltages respectively corresponding to the memory blocks in each first super block and respectively in M memory dies are determined, thereby determining M first read voltages. Then, the M first read voltages are adjusted to M second read voltages, and the equilibrium values of the plurality of second read voltages respectively corresponding to the plurality of memory block in the same memory die are then calculated to obtain M first equilibrium read voltages. The M first equilibrium read voltages are updated to the first mapping table to obtain the optimized read voltages. In this way, in the first aspect, it can reduce the impact of differences between different memory dies on the service quality and performance of the memory system; in the second aspect, since it is initiated by the memory controller 610 itself, it can be executed a plurality of times throughout the entire lifecycle of the memory system, ensuring the uniformity and stability of the service quality and performance of the memory system.

In some implementations, the memory controller 610 is, in an example, configured to perform a fifth read operation on the plurality of memory blocks of each first super block using the M first read voltages respectively; adjust the first read voltage corresponding to a read-failed memory block to the second read voltage based on a failure of the fifth read operation, and perform a sixth read operation on the read-failed memory block using the second read voltage; and determine that the second read voltage is the optimized read voltage for the read-failed memory block based on a success of the sixth read operation.

For example, the memory controller 610 may perform the fifth read operation on the memory block 0 in the memory die 0 using the first read voltage $V_{10}$, and generate a fifth read result; when the fifth read result indicates that the fifth read operation is failed, the first read voltage $V_{10}$ is adjusted to the second read voltage $V_{200}$; the sixth read operation is performed on the memory block 0 in the memory die 0 using the second read voltage $V_{200}$, and a sixth read result is generated; when the sixth read result indicates a success of the sixth read operation, the second read voltage $V_{200}$ is determined to be the optimized read voltage for the memory block 0 in the memory die 0. Here, in the case that the fifth read result indicates a success of the fifth read operation, the adjustment of the first read voltage can be omitted, that is, the first read voltage V10 can be directly used as the second read voltage V200.

It should be noted that other read operations can also be included between the fifth read operation and the sixth read operation until the read succeeds using the adjusted second read voltage. The example adjustment processes for the first read voltage corresponding to other memory blocks in the first super block are similar to the example of the memory block 0 in the memory die 0. By performing operations similar to the memory block 0 in the memory die 0, a plurality of second read voltages as shown in FIG. 8 can be obtained.

In some implementations, the memory block includes N word line groups, wherein N is an integer greater than 1, and each word line group includes at least one word line; for example, as shown in FIG. 7, the memory block includes 6 word line groups, which are respectively a word line group 0, a word line group 1, . . . , and a word line group 5. It should be noted that FIG. 7 is only an example, and the number of word line groups in each memory block is not limited to 6 as shown in FIG. 7. The number of word lines included in any two word line groups can be the same or different.

In some implementations, the memory controller 610 is, in an example, configured to: determine (M×N) first sub read voltages based on the plurality of first super blocks and the first mapping table; wherein each first read voltage includes N first sub read voltages, and the (M×N) first sub read voltages respectively correspond to (M×N) word line groups of each first super block; adjust (M×N) first sub read voltages respectively corresponding to the (M×N) word line groups of each first super block of the plurality of first super blocks to (M×N) second sub read voltages respectively; determine (M×N) second equilibrium read voltages based on equilibrium values of a plurality of second sub read voltages respectively corresponding to a plurality of memory blocks in the plurality of first super blocks, in the same memory die and in the same word line group; wherein each second equilibrium read voltage is an optimized read voltage of a word line in the plurality of first super blocks, in the same memory die and in the same word line group; and update the first mapping table based on the (M×N) second equilibrium read voltages.

Figure 9A:
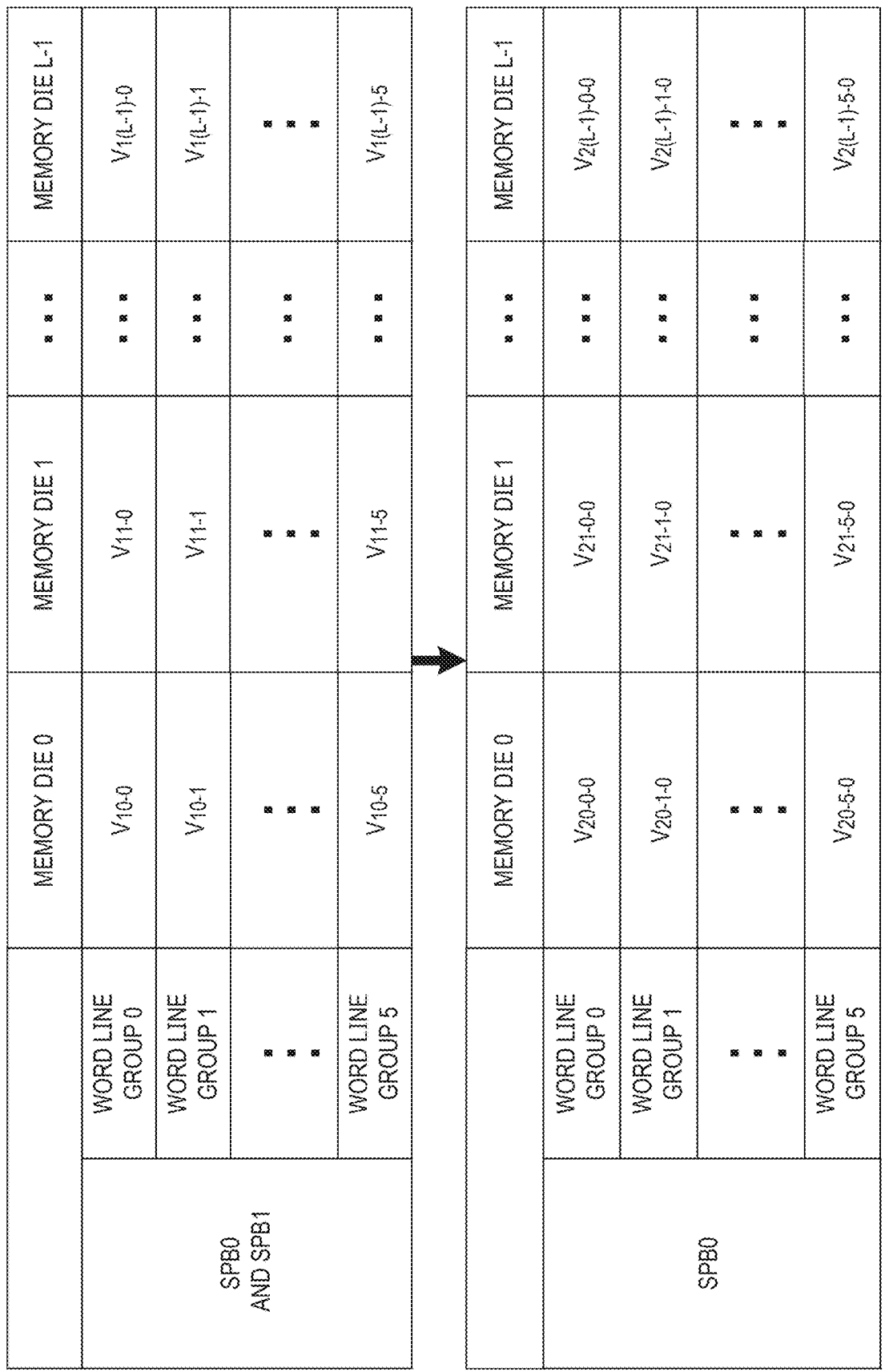
FIGS. 9A and 9B (which may be collectively referred to as FIG. 9) are schematic diagrams of respectively adjusting (M×N) first sub read voltages to (M×N) second equilibrium read voltages illustrated according to the implementation of the present disclosure.
Figure 9B:
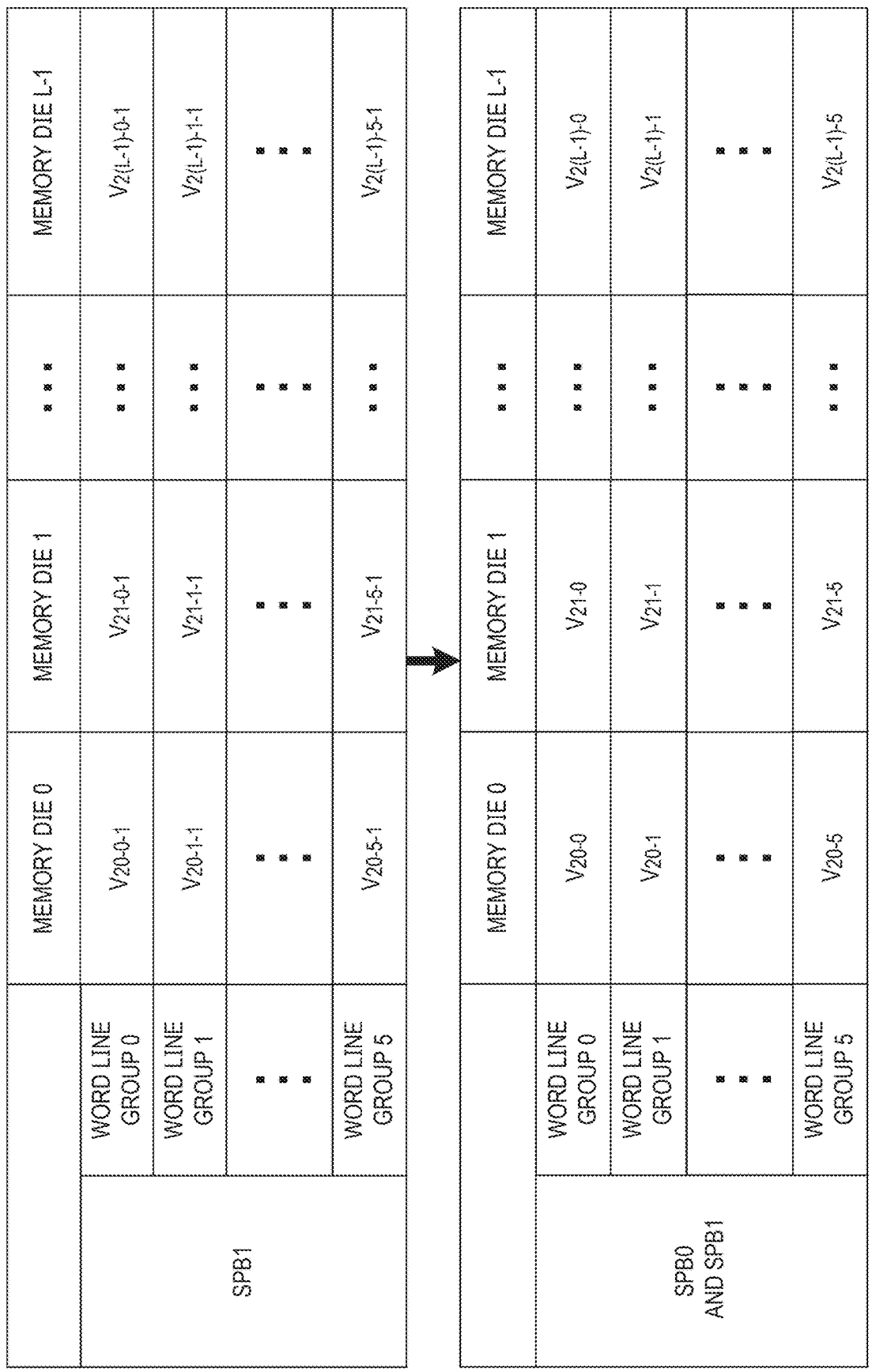

FIG. 9 is a schematic diagram of adjusting (M×N) first sub read voltages to (M×N) second equilibrium read voltages illustrated according to an implementation of the present disclosure. For ease of understanding, FIG. 9 only illustrates two first super blocks (e.g., SPB0 and SPB1), each including memory blocks respectively in L memory dies (e.g., M equals L). However, the number of first super blocks and the grouping way of first super blocks are not limited thereto. In the following, two first super blocks will be used as examples and illustrated in conjunction with FIG. 9.

Each mapping entry of the M mapping entries can include N sub mapping entries. One of the N sub mapping entries is configured to record the mapping relationship between one word line group in one memory die and one first sub read voltage. The memory controller 610 can determine the first sub read voltage corresponding to one word line group in one memory die by looking up the first mapping table (in an example, looking up the sub mapping table rr_0_M_N), thereby determining the (M×N) first sub read voltages. For example, as shown in FIGS. 8 and 9, the memory controller 610 can determine the first sub read voltages respectively corresponding to the 6 word line groups in each memory die by looking up the sub mapping table rr_0_M_N, thereby determining 6L first sub read voltages.

Taking the memory die 0 as an example, the first read voltage $V_{10}$ includes the first sub read voltage $V_{10\text{-}0}$, the first sub read voltage $V_{10\text{-}1}$, . . . , and the first sub read voltage $V_{10\text{-}5}$ respectively corresponding to the word line group 0, the word line group 1, . . . , and the word line group 5 in the memory die 0. It can be understood that due to the matching of the state parameters of both SPB0 and SPB1 with the preset state parameters, the first sub read voltages corresponding to the word lines of the plurality of memory blocks in SPB0 and SPB1, in the same memory die and in the same word line group are the same. For example, both of the word line groups 0 of the memory block 0 and the memory block 1 in SPB0 and SPB1 and in the memory die 0 correspond to the first sub read voltage $V_{10\text{-}0}$, both of the word line groups 1 of the memory block 0 and the memory block 1 in SPB0 and SPB1 and in the memory die 0 correspond to the first sub read voltage $V_{10\text{-}1}$, ..., and both of the word line groups 5 of the memory block 0 and the memory block 1 in SPB0 and SPB1 and in the memory die 0 correspond to the first sub read voltage $V_{10\text{-}5}$. The 6 first sub read voltages respectively corresponding to 6 word line groups in the memory die 1, ..., and the memory die L−1 are similar to those in the memory die 0, please refer to FIG. 9. For simplicity, it will not be further detailed.

The memory controller 610 can adjust the (M×N) first sub read voltages respectively corresponding to the (M×N) word line groups in each of the plurality of first super blocks to (M×N) second sub read voltages respectively. For example, as shown in FIG. 9, the memory controller 610 can adjust the 6L first sub read voltages $V_{10\text{-}0}$ to $V_{1(L-1)\text{-}5}$ respectively corresponding to the 6L word line groups of SPB0 to 6L second sub read voltages $V_{20\text{-}0\text{-}0}$ to $V_{2(L-1)\text{-}5\text{-}0}$ respectively, and adjust the 6L first sub read voltages $V_{10\text{-}0}$ to $V_{1(L-1)\text{-}5}$ respectively corresponding to the 6L word line groups of SPB1 to 6L second sub read voltages $V_{20\text{-}0\text{-}1}$ to $V_{2(L-1)\text{-}5\text{-}1}$ respectively. Here, the second sub read voltage and the corresponding first sub read voltage may be the same or different, for example, $V_{20\text{-}0\text{-}0}$ and $V_{10\text{-}0}$ may be the same or different, and the second sub read voltage respectively corresponding to the word lines of the plurality of memory blocks in the same memory die and in the same word line group may be the same or different. For example, $V_{20\text{-}0\text{-}0}$ and $V_{20\text{-}0\text{-}1}$ may be the same or different.

The memory controller 610 can determine (M×N) second equilibrium read voltages based on the equilibrium values of the plurality of second sub read voltages respectively corresponding to the plurality of memory blocks in the plurality of first super blocks, in the same memory die and in the same word line group. For example, as shown in FIG. 9, the memory controller 610 can determine the second equilibrium read voltage $V_{20\text{-}0}$ based on the equilibrium values of the second sub read voltage $V_{20\text{-}0\text{-}0}$ and the second sub read voltage $V_{20\text{-}0\text{-}1}$ respectively corresponding to the word line groups 0 in the memory block 0 and the memory block 1 in the memory die 0, determine the second equilibrium read voltage $V_{20\text{-}1}$ based on the equilibrium values of the second sub read voltage $V_{20\text{-}1\text{-}0}$ and the second sub read voltage $V_{20\text{-}1\text{-}1}$ respectively corresponding to the memory block 0 and the memory block 1 in the memory die 0 and in the word line group 1, ..., determine the second equilibrium read voltage $V_{20\text{-}5}$ based on the equilibrium values of the second sub read voltage $V_{20\text{-}5\text{-}0}$ and the second sub read voltage $V_{20\text{-}5\text{-}1}$ respectively corresponding to the memory block 0 and the memory block 1 in the memory die 0 and in the word line group 1. The 6 second equilibrium read voltages respectively corresponding to the 6 word line groups in the memory die 1, ..., and the memory die L−1 are similar to those in the memory die 0, as shown in FIG. 9. For simplicity, they will not be repeated.

The memory controller 610 can update the first mapping table based on (M×N) second equilibrium read voltages. For example, as shown in FIG. 9, the memory controller 610 can update the 6L first sub read voltages $V_{10\text{-}0}$ to $V_{1(L-1)\text{-}5}$ to 6L second equilibrium read voltages $V_{20\text{-}0}$ to $V_{2(L-1)\text{-}5}$ respectively. The second equilibrium read voltage $V_{20\text{-}0}$ can be used as the optimized read voltage for the word lines of the word line group 0 of the memory block 0 and the memory block 1 in the memory die 0, ..., and the second equilibrium read voltage $V_{2(L-1)\text{-}5}$ can be used as the optimized read voltage for the word lines of the word line group 5 of the memory block 0 and the memory block 1 in the memory die L−1.

It should be noted that the above determination of the second equilibrium read voltage can be to calculate an average of the plurality of second sub read voltages respectively corresponding to the plurality of memory blocks in the same memory die and in the same word line group, and obtain the corresponding second equilibrium read voltage; and it can also be to assign different weights to the plurality of second sub read voltages respectively corresponding to the plurality of memory blocks in the same memory die and in the same word line group, and calculate the corresponding second equilibrium read voltage through weighted averaging. Of course, other statistical ways known in this field can also be used, and the second equilibrium read voltage is configured to comprehensively reflect the overall situation of the word lines of the plurality of memory blocks in the same memory die and the same word line group.

In practical applications, the above similar steps can be performed a plurality of or multiple times throughout the entire lifecycle of the memory system. In an example, it can be initiated by the memory controller 610 itself to reduce the impact of differences between different memory dies and differences between different word lines in the same memory die on the service quality and performance of the memory system.

In some implementations, the memory controller 610 is, in an example, configured to: perform a first read operation on a memory cell coupled to at least one word line in each of (M×N) word line groups of each first super block using the (M×N) first sub read voltages respectively; adjust the first sub read voltage corresponding to a read-failed word line group to the second sub read voltage based on a failure of the first read operation, and perform a second read operation on a memory cell coupled to at least one word line of the read-failed word line group using the second sub read voltage; determine the second sub read voltage as an optimized read voltage of the read-failed word line group based on a success of the second read operation.

For example, the memory controller 610 may: perform a first read operation on a memory cell coupled to a target word line in the word line group 0 of the memory block 0 in the memory die 0 using the first sub read voltage $V_{10\text{-}0}$, and generate a first read result, wherein in the case that the first read result indicates that the first read operation is failed, the first sub read voltage $V_{10\text{-}0}$ is adjusted to the second sub read voltage $V_{20\text{-}0\text{-}0}$; and perform a second read operation on the memory cell coupled to the target word line in the word line group 0 of the memory block 0 in the memory die 0 using the second sub read voltage $V_{20\text{-}0\text{-}0}$, and generate a second read result, wherein in the case that the second read result indicates a success of the second read operation, the second sub read voltage $V_{20\text{-}0\text{-}0}$ is determined to be the optimized read voltage for the word line group 0 of the memory block 0 in the memory die 0. Here, in the case that the first read result indicates a success of the first read operation, the adjustment of the first sub read voltage can be omitted, that is, the first sub read voltage $V_{10\text{-}0}$ can be directly used as the second sub read voltage $V_{20\text{-}0\text{-}0}$.

It should be noted that other read operations can also be included between the first read operation and the second read operation until the read succeeds using the adjusted second sub read voltage. The example adjustment process for the first sub read voltage corresponding to other word line groups in the memory die 0, as well as the example adjustment process for the first sub read voltage respectively corresponding to the plurality of word line groups in other memory dies are similar to the example of the word line group 0 in the memory block 0 in the memory die 0. By performing operations similar to the word line group 0 of the memory block 0 in the memory die 0, the plurality of second sub read voltages as shown in FIG. 9 can be obtained.

In some implementations, the memory controller 610 is further configured to: determine initial read voltages corresponding to the plurality of first super blocks based on the state parameters of the plurality of first super blocks and a second mapping table; wherein the second mapping table includes mapping entries between a plurality of state parameter intervals and a plurality of the initial read voltages; perform a third read operation on a plurality of memory blocks in each first super block using the initial read voltages corresponding to the plurality of first super blocks respectively; adjust the initial read voltage corresponding to a read-failed memory block to the first read voltage based on a failure of the third read operation, and perform a fourth read operation on the read-failed memory block using the first read voltage; and determine the first read voltage as an initial optimal read voltage of the read-failed memory block based on a success of the fourth read operation, and generate the first mapping table.

Table 2 is a schematic diagram of a second mapping table illustrated according to an implementation of the present disclosure. In the following, two first super blocks SPB0 and SPB1 will be used as examples and illustrated in conjunction with Table 1, Table 2, and FIG. 8.

TABLE 2

Schematic diagram of the second mapping table

| pe range | retention | | | | | |
|---|---|---|---|---|---|---|
| | <T1 | [T1, T2) | [T2, T3) | [T3, T4) | [T4, T5) | [T5, T6) |
| <pe_1 | rr_0 | rr_1 | rr_2 | rr_3 | rr_4 | rr_5 |
| [pe_1, pe_2) | rr_6 | rr_7 | rr_8 | rr_9 | rr_10 | rr_11 |
| [pe_2, pe_3) | rr_12 | rr_13 | rr_14 | rr_15 | rr_16 | rr_17 |
| ≥pe_3 | rr_18 | rr_19 | rr_20 | rr_21 | rr_22 | rr_23 |

As shown in Table 2, the second mapping table includes mapping entries between a plurality of state parameter intervals and a plurality of initial read voltages. One mapping entry in the second mapping table is configured to record a mapping relationship between one state parameter interval and one initial read voltage. For example, if both of the erase numbers of SPB0 and SPB1 are less than pe_1, and both of the data retention times of SPB0 and SPB1 are less than T1, the memory controller 610 can determine that the initial read voltage corresponding to SPB0 and SPB1 is rr-0 by looking up the second mapping table.

The memory controller 610 can: perform a third read operation on the memory block 0 in SPB0 and in the memory die 0 using the initial read voltage rr_0, and generate a third read result; in the case that the third read result indicates that the third read operation is failed, adjust the initial read voltage rr_0 corresponding to the memory block 0 in the memory die 0 to the first read voltage $V_{10}$;

perform a fourth read operation on the memory block 0 in the memory die 0 using the first read voltage $V_{10}$, and generate a fourth read result; in the case that the fourth read result indicates a success of the fourth read operation, determine that the first read voltage $V_{10}$ is the initial optimal read voltage of the memory block 0 in the memory die 0.

It should be noted that other read operations can also be included between the third read operation and the fourth read operation until the read succeeds using the adjusted first read voltage. The specific adjustment process for the initial read voltage of other memory blocks in the plurality of first super blocks is similar to the example of the memory block 0 in the memory die 0. By performing operations similar to the memory block 0 in the memory die 0, the plurality of first read voltages as shown in FIG. 8 can be obtained.

It should be pointed out that when performing a read operation using the initial read voltage of the second mapping table, the initial read voltages of all of the super blocks within the same state parameter interval will be consistent. For example, the initial read voltages of all of the memory blocks in SPB0 and SPB1 will be rr_0. However, after several erases and a certain retention time, due to the differences between a plurality of memory dies and the differences between the word lines, it will be difficult to meet the actual read requirements using consistent initial read voltages. Therefore, a more refined read voltage mapping table is needed.

In the implementation of the present disclosure, the initial read voltages corresponding to the plurality of first super blocks can be determined by the state parameters of the plurality of first super blocks and the second mapping table. By using the initial read voltages corresponding to the plurality of first super blocks, the initial read voltages of the plurality of memory blocks in each first super block are respectively adjusted to obtain the initial optimal read voltage (e.g., the first read voltage) corresponding to each memory block, and generate a first mapping table and thus make a more refined adjustment to the read voltage of the memory blocks, in order to reduce the impact of differences between different memory dies on the service quality and performance of the memory system.

In some implementations, the first mapping table includes a first sub mapping table and a second sub mapping table; wherein the state parameters of the super blocks in the first sub mapping table are different from those of the super blocks in the second sub mapping table. The first sub mapping table can be one of the plurality of sub mapping tables shown in Table 1 above, and the second sub mapping table can be another sub mapping table of the plurality of sub mapping tables shown in Table 1 aforementioned.

In some implementations, the memory controller 610 is configured to: generate the first sub mapping table based on first state parameters of the plurality of first super blocks and the second mapping tables; and generate the second sub mapping table based on second state parameters of the plurality of second super blocks of the plurality of super blocks and the second mapping table; wherein the second state parameters of the plurality of second super blocks are different from the first state parameters of the plurality of first super blocks.

For example, as shown in Table 2, if the erase numbers of the plurality of first super blocks are all less than pe_1 and the data retention time of the plurality of first super blocks is less than T1, the memory controller 610 can adjust the initial read voltage rr_0 corresponding to the plurality of first super blocks and generate the first sub mapping table; if the erase numbers of the plurality of second super blocks are all less than pe_1, and the data retention time of the plurality of second super blocks is greater than or equal to T1 and less In some implementations, the memory controller 610 is, in an example, configured to: determine M voltage differences based on corresponding differences between the M first equilibrium read voltages and the M first read voltages; and update the M first read voltages in the first mapping table to the M voltage differences.

Table 3 is schematic diagram 2 of a first mapping table illustrated according to the implementation of the present disclosure. In the following, two first super blocks SPB0 and SPB1 will be used as examples and illustrated in conjunction with table 1, table 3, and FIG. 8.

TABLE 3

| | Schematic diagram 2 of the first mapping table | | | | | |
|---|---|---|---|---|---|---|
| | | | Retention | | | |
| PE range | <t1 | [t1, t2) | [t2, t3) | [t3, t4) | [t4, t5) | [t5, t6) |
| <PE_1 | delta_0_M_N | delta_1_M_N | delta_2_M_N | delta_3_M_N | delta_4_M_N | delta_5_M_N |
| [PE_1, PE_2) | delta_6_M_N | delta_7_M_N | delta_8_M_N | delta_9_M_N | delta_10_M_N | delta_11_M_N |
| [PE_2, PE_3) | delta_12_M_N | delta_13_M_N | delta_14_M_N | delta_15_M_N | delta_16_M_N | delta_17_M_N |
| ≥PE_3 | delta_18_M_N | delta_19_M_N | delta_20_M_N | delta_21_M_N | delta_22_M_N | delta_23_M_N | than T2, the memory controller 610 can adjust the initial read voltage rr_1 corresponding to the plurality of second super blocks and generate the second sub mapping table.

It can be understood that, in the implementation of the present disclosure, the memory block controller can adjust the initial read voltages corresponding to the super blocks of different state parameter intervals, thereby generating the plurality of sub mapping tables. A set of the plurality of sub mapping tables forms the first mapping table, and based on the second mapping table, a more refined first mapping table is generated to meet actual read needs.

In some implementations, the memory controller 610 is, in an example, configured to: determine a state parameter of a target super block in a plurality of the super blocks; decide whether the state parameter of the target super block matches the preset state parameter; and determine the target super block as the first super block based on the state parameter of the target super block matching the preset state parameter.

In the implementation of the present disclosure, the memory controller 610 can first obtain the state parameter of the target super block, and then determine whether the state parameter of the target super block matches the preset state parameter. When the state parameter of the target super block matches the preset state parameter, the target super block is used as the first super block for optimization of the read voltage. Here, the state parameter of the target super block can be stored in a register within the memory controller 610 or stored in the memory device 620.

In some implementations, the memory controller 610 is configured to: generate a scan command based on the memory controller 610 being idle; wherein the scan command is configured to instruct to obtain, from the plurality of super blocks, the super block of which the state parameter matches the preset state parameter. For example, the memory controller 610 can generate the scan command in the background process, select, from the plurality of super blocks, the super block of which the state parameter matches the preset state parameter, and then perform the operation of optimization of read voltage.

The memory controller 610 can calculate the difference between each first equilibrium read voltage and the corresponding first read voltage to obtain M voltage differences, and update each first equilibrium read voltage to the corresponding voltage difference. For example, as shown in FIG. 8, the memory controller 610 can calculate the difference between the first equilibrium read voltage $V_{20}$ and the first read voltage $V_{10}$ to obtain the voltage difference delta $V_{20}$, calculate the difference between the first equilibrium read voltage $V_{21}$ and the first read voltage $V_{11}$ to obtain the voltage difference delta $V_{21}$, . . . , and calculate the difference between the first equilibrium read voltage $V_{2(L-1)}$ and the first read voltage $V_{1(L-1)}$ to obtain the voltage difference delta $V_{2(L-1)}$; update the L first read voltages $V_{10}$, $V_{11}$, . . . , and $V_{1(L-1)}$ in the sub mapping table rr_0_M_N to L voltage differences delta$V_{20}$, delta$V_{21}$, . . . , and delta $V_{2(L-1)}$ respectively, to obtain the sub mapping table delta_0_M_N in Table 3. The example update processes for the other sub mapping tables in Table 3 are similar to the example of the sub mapping table delta_0_M_N. By performing operations similar to the example of the sub mapping table delta_0_M_N, the plurality of sub mapping tables as shown in Table 3 can be obtained.

It can be understood that the above voltage difference is configured to represent the offset of the read voltage. In actual read, the current optimized read voltage can be determined based on the voltage difference and the first read voltage before the update, thereby meeting a current read requirement.

Figure 10:
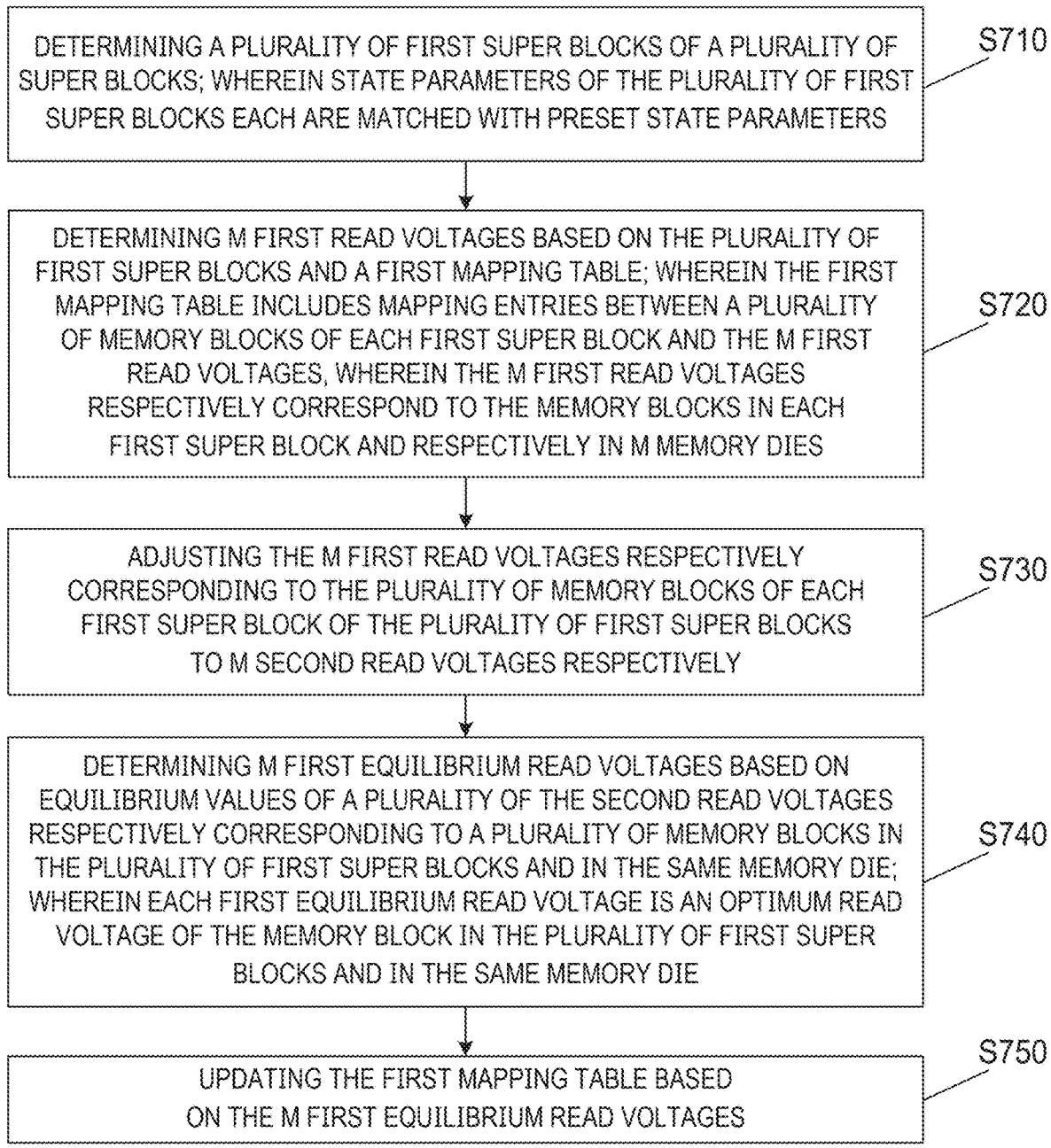
FIG. 10 is a flowchart of a method of operating a memory system illustrated according to an implementation of the present disclosure.

Based on the aforementioned memory system, an implementation of the present disclosure provides a method of operating a memory system. FIG. 10 is a flowchart of a method of operating a memory system according to implementations of the present disclosure. As shown in FIG. 10, the method includes at least the following operations:

S710: determining a plurality of first super blocks of a plurality of super blocks; wherein state parameters of the plurality of first super blocks each are matched with preset state parameters;

S720: determining M first read voltages based on the plurality of first super blocks and a first mapping table; wherein the first mapping table includes mapping entries between a plurality of memory blocks of each first super block and the M first read voltages, wherein the M first read voltages respectively correspond to the memory blocks in each first super block and respectively in M memory dies;

S730: adjusting the M first read voltages respectively corresponding to the plurality of memory blocks of each first super block of the plurality of first super blocks to M second read voltages;

S740: determining M first equilibrium read voltages based on equilibrium values of a plurality of the second read voltages respectively corresponding to a plurality of memory blocks in the plurality of first super blocks and in the same memory die; wherein each first equilibrium read voltage is an optimized read voltage of the memory block in the plurality of first super blocks and in the same memory die;

S750: updating the first mapping table based on the M first equilibrium read voltages.

In some implementations, the memory block includes N word line groups, and each word line group includes at least one word line; wherein the above operation S720 includes: determining (M×N) first sub read voltages based on the plurality of first super blocks and the first mapping table, wherein each first read voltage includes N first sub read voltages, and the (M×N) first sub read voltages respectively correspond to (M×N) word line groups of each first super block; wherein the above operation S730 includes: adjusting the (M×N) first sub read voltages respectively corresponding to the (M×N) word line groups of each first super block of the plurality of first super blocks to (M×N) second sub read voltages respectively; wherein the above operation S740 includes: determining (M×N) second equilibrium read voltages based on equilibrium values of a plurality of the second sub read voltages respectively corresponding to a plurality of memory blocks in the plurality of first super blocks, in the same memory die and in the same word line group; wherein each second equilibrium read voltage is an optimized read voltage of a word line in the plurality of first super blocks, in the same memory die and in the same word line group; and wherein the above operation S750 includes: updating the first mapping table based on the (M×N) second equilibrium read voltages.

In some implementations, the adjusting the (M×N) first sub read voltages respectively corresponding to the (M×N) word line groups of each first super block of the plurality of first super blocks to (M×N) second sub read voltages respectively includes: performing a first read operation on a memory cell coupled to at least one word line in each of (M×N) word line groups of each first super block using the (M×N) first sub read voltages respectively; adjusting the first sub read voltage corresponding to a read-failed word line group to the second sub read voltage based on a failure of the first read operation, and performing a second read operation on a memory cell coupled to at least one word line of the read-failed word line group using the second sub read voltage; and determining the second sub read voltage as an optimized read voltage of the read-failed word line group based on a success of the second read operation.

In some implementations, the above method further includes: determining initial read voltages corresponding to the plurality of first super blocks based on the state parameters of the plurality of first super blocks and a second mapping table; wherein the second mapping table includes mapping entries between a plurality of state parameter intervals and a plurality of the initial read voltages; performing a third read operation on a plurality of memory blocks in each first super block using the initial read voltages corresponding to the plurality of first super blocks respectively; adjusting the initial read voltage corresponding to a read-failed memory block to the first read voltage based on a failure of the third read operation, and performing a fourth read operation on the read-failed memory block using the first read voltage; and determining the first read voltage as an initial optimal read voltage of the read-failed memory block based on a success of the fourth read operation, and generate the first mapping table.

In some implementations, the first mapping table includes a first sub mapping table and a second sub mapping table; wherein a state parameter of a super block in the first sub mapping table is different from that of a super block in the second sub mapping table.

In some implementations, the state parameter includes at least one of the erase number and the data retention time.

In some implementations, the above operation S730 includes: performing a fifth read operation on the plurality of memory blocks of each first super block using the M first read voltages respectively; adjusting the first read voltage corresponding to a read-failed memory block to the second read voltage based on a failure of the fifth read operation, and performing a sixth read operation on the read-failed memory block using the second read voltage; and determining that the second read voltage is the optimized read voltage for the read-failed memory block based on a success of the sixth read operation.

In some implementations, the above operation S710 includes: determining a state parameter of a target super block in a plurality of the super blocks; deciding whether the state parameter of the target super block matches the preset state parameter; and determining the target super block as the first super block based on the state parameter of the target super block matching the preset state parameter.

In some implementations, the above methods further includes: generating a scan command based on the memory controller 610 being idle; wherein the scan command is configured to instruct to obtain, from the plurality of super blocks, the super block of which the state parameter matches the preset state parameter.

In some implementations, the above operation S750 includes: updating the M first read voltages in the first mapping table to the M first equilibrium read voltages.

In some implementations, the above operation S750 includes: determining M voltage differences based on corresponding differences between the M first equilibrium read voltages and the M first read voltages; and updating the M first read voltages in the first mapping table to the M voltage differences.

In the implementation of the present disclosure, the method of operating the memory system can be executed by the memory controller 610 in the memory system in any of the aforementioned implementations, and the technical effects that can be achieved by the memory system in the aforementioned implementations can also be achieved by the method of operating the memory system, and will not be repeated here. Regarding the methods in the above implementations, the example implementation of each operation in the above implementations have been described in detail in the relevant device implementations, and will not be elaborated here.

Figure 11:
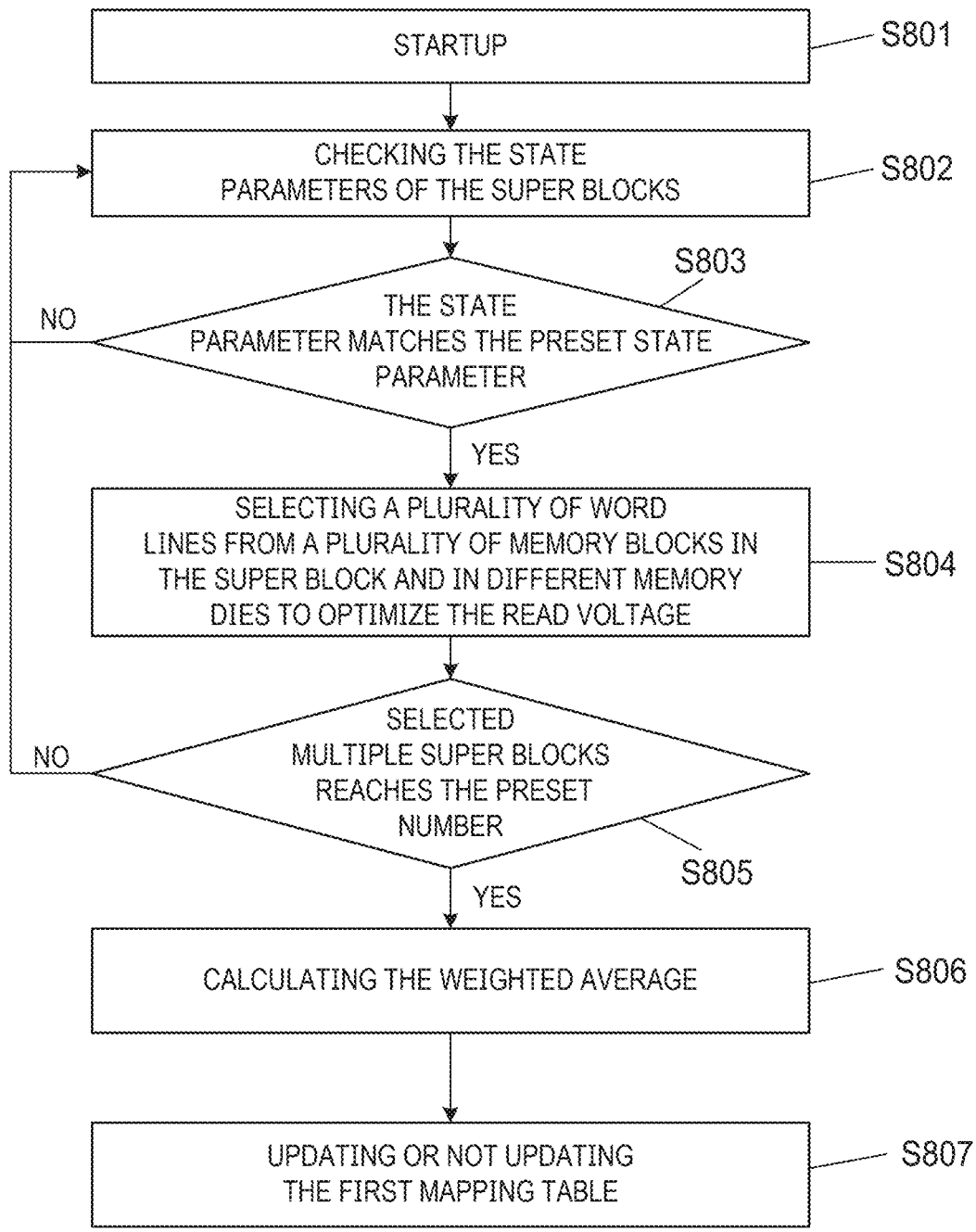
FIG. 11 is a flowchart of updating a first mapping table illustrated according to an implementation of the present disclosure.

FIG. 11 is a flowchart for updating the first mapping table illustrated according to the implementation of the present disclosure. In the following, an example explanation of the method of operating the memory provided in the implementation of the present disclosure will be illustrated in conjunction with FIG. 11.

As shown in FIG. 11, in operation S801, upon startup, the memory system performs a power-on initialization operation to load configuration parameters, correction and adjustment parameters, status parameters, etc. into the registers of the memory controller 610 for fast access. Here, when the first mapping table is stored in the memory device 620, it can be loaded into a register during power-on initialization.

In operation S802, the state parameters of the super blocks are checked. In an example, the processor in FIG. 6 can detect the state parameter of the target super block in the plurality of super blocks by accessing registers, thereby determining the state parameter of the target super block.

In operation S803, it is decided that whether the state parameter of the target super block matches the preset state parameter. If the state parameter of the target super block matches the preset state parameter, then the target super block is the first super block, and the flow continues with operation S804; if the state parameter of the target super block does not match the preset state parameter, the flow goes back to operation S802 to detect the state parameters of other target super blocks.

In operation S804, a plurality of word lines are selected from a plurality of memory blocks in the super block and in different memory dies to optimize the read voltage. In an example, taking the first super block SPB0 in FIG. 9 as an example, the 6L first sub read voltages $V_{10\text{-}0}$ to $V_{1(L\text{-}1)\text{-}5}$ respectively corresponding to the 6L word line groups are determined by looking up the first mapping table; at least one word line is selected from each of the 6L word line groups, and the corresponding first sub read voltage is applied to the selected word line to perform the first read operation, and the first read result is generated; in the case that the first read result indicates a failure of the first read operation, the first sub read voltage applied to the read-failed word line is adjusted to the second sub read voltage, and the second sub read voltage is applied to the read-failed word line to perform the second read operation, and the second read result is generated; in the case that the second read result indicates a success of the second read operation, the second sub read voltage is determined as the optimized read voltage for the read-failed line, thereby achieving optimization of the read voltage.

In operation S805, it is decided that whether the number of selected multiple super blocks has reached the preset number. If the preset number is reached, operation S806 is executed; and if the preset number is not reached, the flow goes back to operation S802 and continues selecting the super block that matches the preset state parameter to optimize the read voltage. Here, the preset number can be two or more. For example, it is required to select six super blocks that match the preset state parameters. The example processes of optimizing the read voltage of other super blocks can refer to the above implementations.

In operation S806, the weighted average is calculated. For example, the weighted average of the plurality of second sub read voltages respectively corresponding to the plurality of memory blocks in the plurality of first super blocks, in the same memory die and in the same word line group is calculated, thereby obtaining a plurality of second equilibrium read voltages $V_{20\text{-}0}$ to $V_{2(L\text{-}1)\text{-}5}$.

In operation S807, the first mapping table is updated or not updated. If the calculated weighted average is exactly the same as the first mapping table, the first mapping table may not be updated; and if the calculated weighted average is different from the first mapping table, the first mapping table needs to be updated. In an example, if the calculated weighted average is partially different from the first mapping table, the part of the first mapping table that is different from the weighted average needs to be updated.

It should be noted that throughout the entire lifecycle of the memory system, the above operations S801 to S807 can be executed a plurality of times to continuously optimize the operation parameters (such as the read voltage) of the memory system, thereby reducing the impact of differences between different memory dies on the service quality and performance of the memory system.

Figure 12:
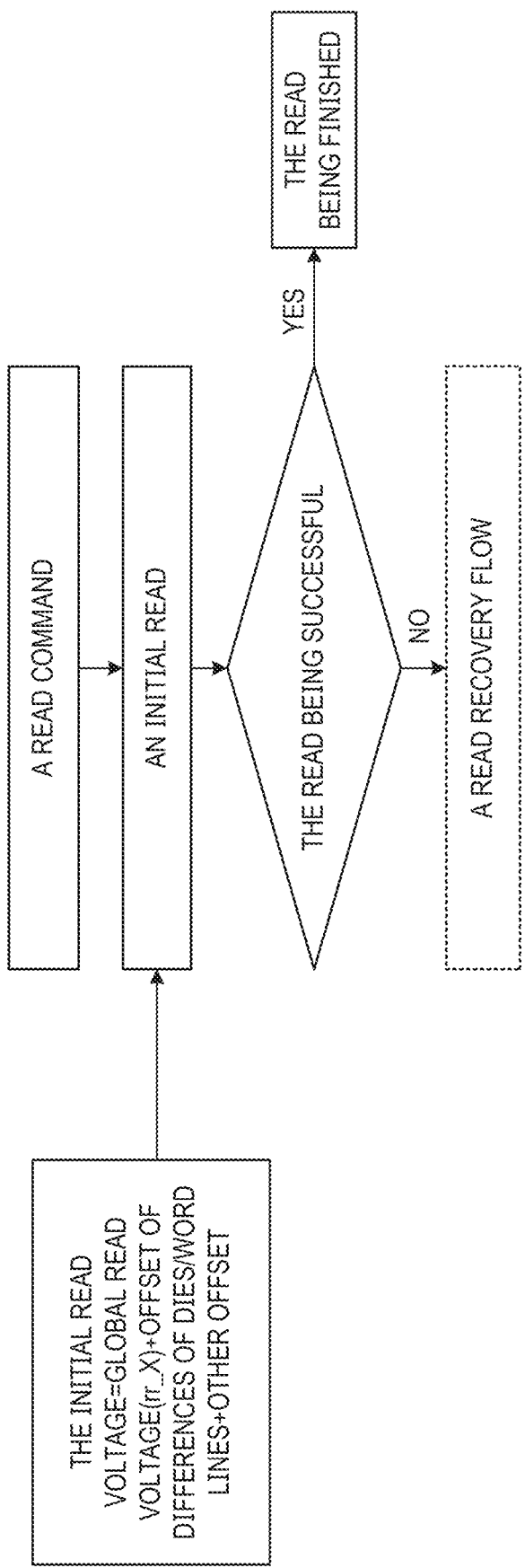
FIG. 12 is a flowchart of a read operation illustrated according to an implementation of the present disclosure.

FIG. 12 is a flowchart of a read operation illustrated according to the implementation of the present disclosure. As shown in FIG. 12, a read command is sent to the memory system from external (such as the host 108 in FIG. 1), and the memory controller 610 executes an initial read operation in response to the read command. For example, the initial read voltage corresponding to the initial read operation can be obtained and sent to the memory device 620. The memory device 620 applies the initial read voltage to the word line coupled to the selected memory cell, and obtains the read result by sensing the current on the bit line coupled to the selected memory cell. The memory controller 610 decides whether the read is successful based on the read result. If the read is successful, the completion of the read is reported to the host; and if the read is not successful, the read recovery flow needs to be executed, for example, the initial read voltage needs to be adjusted. However, executing the read recovery flow will increase the time required for read operation, resulting in significant host read delay and high firmware overhead.

According to the memory system and its method of operation provided in the implementations of the present disclosure, as the memory controller 610 can update the read voltage in the first mapping table in the background process, so that the updated read voltage meets the actual read requirements, thus the read recovery flow (as shown by the dashed box in FIG. 12) can be omitted, thereby reducing the host read delay and firmware overhead.

Figure 13:
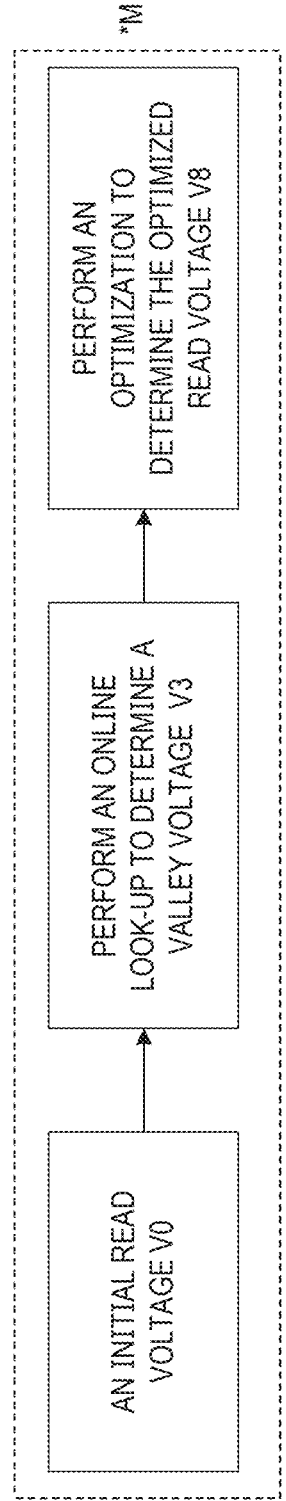
FIG. 13 is a flowchart of adjusting a read voltage illustrated according to an implementation of the present disclosure.
Figure 14:
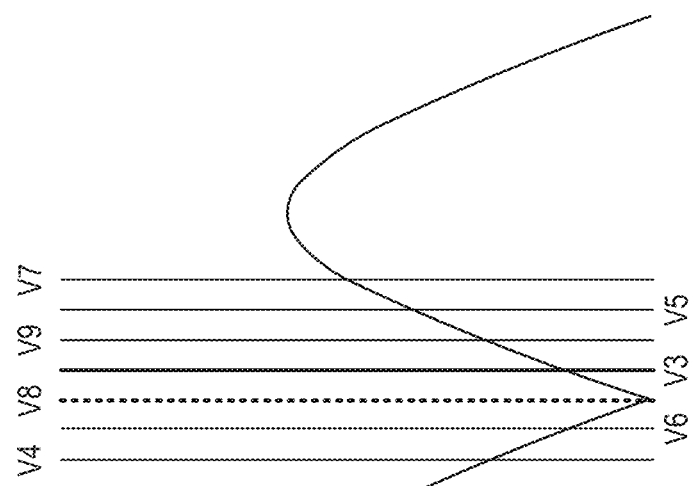
FIG. 14 is a schematic diagram of adjusting a read voltage illustrated according to an implementation of the present disclosure.
Figure 14:
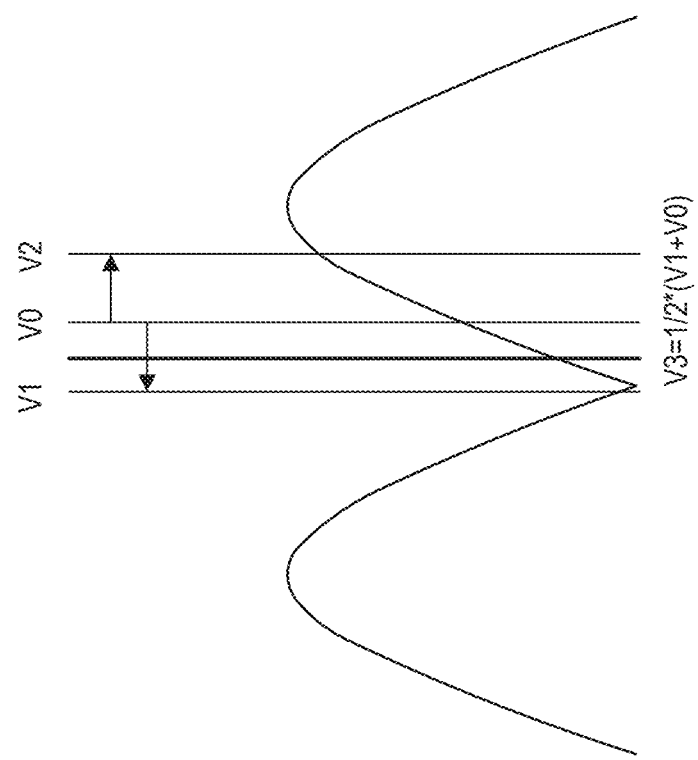

FIG. 13 is a flowchart of adjusting the read voltage illustrated according to the implementation of the present disclosure, and FIG. 14 is a schematic diagram of adjusting the read voltage illustrated according to the implementation of the present disclosure. An example explanation of the process of adjusting the read voltage by the memory controller 610 provided in the implementation of the present disclosure will be illustrated in the following in combination with FIGS. 13 and 14.

Referring to FIGS. 13 and 14, the memory controller 610 can determine the initial read voltage V0 corresponding to SPB0 by looking up the second mapping table, and perform an online look-up on the memory block 0 in the memory die 0 (as shown in the left part in FIG. 14) using the initial read voltage V0, determine a valley voltage V3 corresponding to the memory block 0 in the memory die 0, optimize the read voltage based on the valley voltage V3 (as shown in the right part in FIG. 14), and thus determine the optimized read voltage V8 corresponding to the memory block 0 in the memory die 0.

It can be understood that the memory controller can also perform similar methods to optimize the optimized the read voltage corresponding to the memory block 0 in SPB0 and in other memory dies, and optimize the optimized read voltage corresponding to each memory block of other super blocks, then perform weighted average calculation similar to the above implementation, and thus obtain the optimized read voltage corresponding to each memory block in the same memory die or the optimized read voltage corresponding to the plurality of memory blocks in the same memory die and in the same word group. In this way, it can ensure continuous optimization in all periods, not only in the early life of the product, but also in the midlife and the late life, taking into account all real reliability scenarios.

Based on the aforementioned memory system, the implementation of the present disclosure further provides an electronic apparatus including: a memory system of any of the aforementioned implementations; and a host, coupled to the memory system. Regarding the electronic apparatus, please refer to the relevant description in the example shown in FIG. 1. For simplicity, it will not be repeated.

Based on the aforementioned memory system, the implementation of the present disclosure also provides a computer-readable storage medium, on which instructions are stored. When the instructions are executed by a processor, the method as described in any of the above implementations is implemented.

Here, in order to implement all or part of the flows in the method of the above implementations, hardware related to instructions (such as a computer program) can be used to achieve it. The computer program can be stored in a computer-readable storage medium, and the execution of the computer program can include the flow of the method in any of the above implementations, wherein the computer-readable storage media can be magnetic disks, optical discs, a read only memory (ROM), a random-access memory (RAM), a flash memory, a hard disk drive (HDD), or a solid-state drive, etc. The computer readable storage media can also include a combination of a plurality of the aforementioned storage media.

The methods disclosed in several method implementations provided in the present disclosure can be combined arbitrarily to obtain new method implementations without conflict.

The features disclosed in the several device implementations provided in the present disclosure can be combined arbitrarily to obtain new device implementations without conflict.

It should be understood that references throughout the specification to "one implementation" or "an implementation" imply that specific features, structures, or characteristics related to the implementations are included in at least one implementation of the present disclosure. Therefore, terms "in one implementation" or "in an implementation" appearing throughout the entire specification may not necessarily refer to the same implementation. In addition, these specific features, structures, or characteristics can be combined in any suitable way in one or more implementations. It should be understood that in the various implementations of the present disclosure, the size of the sequence numbers of the aforementioned processes does not imply the order of execution. The execution order of each process should be determined by its function and internal logic, and should not constitute any limitation on the implementation process of the implementation of the present disclosure. The above sequence numbers of the implementations of the present disclosure are for description only and do not represent the advantages or disadvantages of the implementations.

It should be noted that herein, the terms "comprising", "including", or any other variation thereof are intended to encompass non-exclusive inclusion, such that a process, method, item, or device that includes a series of elements not only includes those elements, but also includes other elements that are not explicitly listed, or also includes elements inherent to such a process, method, item, or device. Without further limitations, the element limited by the statement "including a . . . " does not exclude the existence of another identical element in the process, method, item, or device that includes that element.

The above are only example implementations of the present disclosure and do not limit the scope of protection of the present disclosure. Changes or replacements that can be thought by any technical personnel familiar with the technical field within the scope of disclosure should be covered within the scope of protection of the present disclosure.

What is claimed is:

1. A memory system comprising:
a memory device comprising L memory dies, each of which comprises memory blocks; wherein the memory blocks in different memory dies form a super block, and L is an integer greater than 1; and
a memory controller coupled to the memory device and configured to:
determine first super blocks of the super blocks; wherein state parameters of the first super blocks are matched with preset state parameters;
determine M first read voltages based on the first super blocks and a first mapping table; wherein the first mapping table includes mapping entries between memory blocks of each first super block and the M first read voltages, the M first read voltages respectively correspond to the memory blocks in each first super block and respectively in M memory dies, and M is a positive integer less than or equal to L;
adjust M first read voltages respectively corresponding to memory blocks of each first super block of the first super blocks to M second read voltages respectively;
determine M first equilibrium read voltages based on equilibrium values of the M second read voltages respectively corresponding to memory blocks in the first super blocks and in a same memory die; wherein each first equilibrium read voltage is an optimized read voltage of the memory blocks in the first super blocks and in the same memory die; and
update the first mapping table based on the M first equilibrium read voltages.

2. The memory system according to claim 1, wherein a memory block of the memory blocks comprises N word line groups, wherein N is an integer greater than 1, and each word line group comprises at least one word line; the memory controller is configured to:
determine (M×N) first sub read voltages based on the first super blocks and the first mapping table; wherein each first read voltage includes N first sub read voltages, and the (M×N) first sub read voltages respectively correspond to (M×N) word line groups of each first super block;
adjust the (M×N) first sub read voltages respectively corresponding to the (M×N) word line groups of each first super block of the first super blocks to (M×N) second sub read voltages respectively;
determine (M×N) second equilibrium read voltages based on equilibrium values of the second sub read voltages respectively corresponding to memory blocks in the first super blocks, in the same memory die and in a same word line group; wherein each second equilibrium read voltage is an optimized read voltage of a word line in the first super blocks, in the same memory die and in the same word line group; and update the first mapping table based on the (M×N) second equilibrium read voltages.

3. The memory system according to claim 2, wherein the memory controller is configured to:
perform a first read operation on a memory cell coupled to at least one word line in each of (M×N) word line groups of each first super block using the (M×N) first sub read voltages respectively;
adjust the first sub read voltage corresponding to a read-failed word line group to the second sub read voltage based on a failure of the first read operation, and perform a second read operation on a memory cell coupled to at least one word line of the read-failed word line group using the second sub read voltage; and
determine the second sub read voltage as an optimized read voltage of the read-failed word line group based on a success of the second read operation.

4. The memory system according to claim 1, wherein the memory controller is further configured to:
determine initial read voltages corresponding to the first super blocks based on the state parameters of the first super blocks and a second mapping table; wherein the second mapping table includes mapping entries between state parameter intervals and the initial read voltages;
perform a third read operation on memory blocks in each first super block using the initial read voltages corresponding to the first super blocks respectively;
adjust the initial read voltage corresponding to a read-failed memory block to a first read voltage based on a failure of the third read operation, and perform a fourth read operation on the read-failed memory block using the first read voltage; and
determine the first read voltage as an initial optimal read voltage of the read-failed memory block based on a success of the fourth read operation, and generate the first mapping table.

5. The memory system according to claim 4, wherein the first mapping table comprises a first sub mapping table and a second sub mapping table; and wherein a state parameter of a super block in the first sub mapping table is different from that of a super block in the second sub mapping table.

6. The memory system according to claim 4, wherein the state parameter comprises at least one of an erase number and a data retention time.

7. The memory system according to claim 1, wherein the memory controller is configured to:
perform a fifth read operation on the memory blocks of each first super block using the M first read voltages respectively;
adjust the first read voltage corresponding to a read-failed memory block to a second read voltage based on a failure of the fifth read operation, and perform a sixth read operation on the read-failed memory block using the second read voltage; and
determine that the second read voltage is the optimized read voltage for the read-failed memory block based on a success of the sixth read operation.

8. The memory system according to claim 1, wherein the memory controller is configured to:
determine a state parameter of a target super block in the super blocks;
decide whether the state parameter of the target super block matches a preset state parameter; and
determine the target super block as a first super block based on the state parameter of the target super block matching the preset state parameter.

9. The memory system according to claim 1, wherein the memory controller is configured to:
generate a scan command based on the memory controller being idle, wherein the scan command is configured to instruct to obtain, from the super blocks, the super block of which a state parameter matches a preset state parameter.

10. The memory system according to claim 1, wherein the memory controller is configured to:
update the M first read voltages in the first mapping table to the M first equilibrium read voltages.

11. The memory system according to claim 1, wherein the memory controller is configured to:
determine M voltage differences based on corresponding differences between the M first equilibrium read voltages and the M first read voltages; and
update the M first read voltages in the first mapping table to the M voltage differences.

12. A method of operating a memory system, comprising:
determining first super blocks of super blocks; wherein state parameters of the first super blocks each are matched with preset state parameters;
determining M first read voltages based on the first super blocks and a first mapping table; wherein the first mapping table includes mapping entries between memory blocks of each first super block and the M first read voltages, wherein the M first read voltages respectively correspond to the memory blocks in each first super block and respectively in M memory dies;
adjusting the M first read voltages respectively corresponding to the memory blocks of each first super block of the first super blocks to M second read voltages respectively;
determining M first equilibrium read voltages based on equilibrium values of the M second read voltages respectively corresponding to memory blocks in the first super blocks and in a same memory die; wherein each first equilibrium read voltage is an optimized read voltage of the memory block in the first super blocks and in the same memory die; and
updating the first mapping table based on the M first equilibrium read voltages.

13. The method according to claim 12, wherein a memory block comprises N word line groups, wherein N is an integer greater than 1, and each word line group comprises at least one word line; wherein
the determining of the M first read voltages based on the first super blocks and the first mapping table comprises:
determining (M×N) first sub read voltages based on the first super blocks and the first mapping table; wherein each first read voltage includes N first sub read voltages, and the (M×N) first sub read voltages respectively correspond to (M×N) word line groups of each first super block;
the adjusting of the M first read voltages respectively corresponding to the memory blocks of the each first super block of the first super blocks to the M second read voltages respectively comprises:
adjusting the (M×N) first sub read voltages respectively corresponding to the (M×N) word line groups of each first super block of the first super blocks to (M×N) second sub read voltages respectively;
the determining of the M first equilibrium read voltages based on the equilibrium values of the M second read voltages respectively corresponding to the memory blocks in the first super blocks and in the same memory die comprises:

determining (M×N) second equilibrium read voltages based on equilibrium values of the second sub read voltages respectively corresponding to memory blocks in the first super blocks, in the same memory die and in a same word line group; wherein each second equilibrium read voltage is an optimized read voltage of a word line in the first super blocks, in the same memory die and in the same word line group; and the updating of the first mapping table based on the M first equilibrium read voltages comprises:
updating the first mapping table based on the (M×N) second equilibrium read voltages.

14. The method according to claim 13, wherein the adjusting of the (M×N) first sub read voltages respectively corresponding to the (M×N) word line groups of each first super block of the first super blocks to the (M×N) second sub read voltages respectively comprises:
performing a first read operation on a memory cell coupled to at least one word line in each of (M×N) word line groups of each first super block using the (M×N) first sub read voltages respectively;
adjusting the first sub read voltage corresponding to a read-failed word line group to the second sub read voltage based on a failure of the first read operation, and performing a second read operation on a memory cell coupled to at least one word line of the read-failed word line group using the second sub read voltage; and
determining the second sub read voltage as an optimized read voltage of the read-failed word line group based on a success of the second read operation.

15. The method according to claim 12, wherein the method further comprises:
determining initial read voltages corresponding to the first super blocks based on the state parameters of the first super blocks and a second mapping table; wherein the second mapping table includes mapping entries between state parameter intervals and the initial read voltages;
performing a third read operation on memory blocks in each first super block using the initial read voltages corresponding to the first super blocks respectively;
adjusting the initial read voltage corresponding to a read-failed memory block to a first read voltage based on a failure of the third read operation, and performing a fourth read operation on the read-failed memory block using the first read voltage; and
determining the first read voltage as an initial optimal read voltage of the read-failed memory block based on a success of the fourth read operation, and generate the first mapping table.

16. The method according to claim 15, wherein the first mapping table comprises a first sub mapping table and a second sub mapping table; and wherein a state parameter of a super block in the first sub mapping table is different from that of a super block in the second sub mapping table.

17. The method according to claim 15, wherein the state parameter comprises at least one of an erase number and a data retention time.

18. The method according to claim 12, wherein the adjusting of the M first read voltages respectively corresponding to the memory blocks of each first super block of the first super blocks to the M second read voltages respectively comprises:
performing a fifth read operation on the memory blocks of each first super block using the M first read voltages respectively;
adjusting the first read voltage corresponding to a read-failed memory block to a second read voltage based on a failure of the fifth read operation, and performing a sixth read operation on the read-failed memory block using the second read voltage; and
determining that the second read voltage is the optimized read voltage for the read-failed memory block based on a success of the sixth read operation.

19. The method according to claim 12, wherein the determining of the first super blocks of the super blocks comprises:
determining a state parameter of a target super block in the super blocks;
deciding whether the state parameter of the target super block matches a preset state parameter; and
determining the target super block as a first super block based on the state parameter of the target super block matching the preset state parameter.

20. An electronic apparatus, comprising:
a memory system comprising:
a memory device comprising L memory dies, each of which comprises memory blocks; wherein the memory blocks in different memory dies form a super block, and L is an integer greater than 1; and
a memory controller coupled to the memory device and configured to:
determine first super blocks of the super blocks; wherein state parameters of the first super blocks are matched with preset state parameters;
determine M first read voltages based on the first super blocks and a first mapping table; wherein the first mapping table includes mapping entries between memory blocks of each first super block and the M first read voltages, the M first read voltages respectively correspond to the memory blocks in each first super block and respectively in M memory dies, and M is a positive integer less than or equal to L;
adjust M first read voltages respectively corresponding to memory blocks of each first super block of the first super blocks to M second read voltages respectively;
determine M first equilibrium read voltages based on equilibrium values of the M second read voltages respectively corresponding to memory blocks in the first super blocks and in a same memory die; wherein each first equilibrium read voltage is an optimized read voltage of the memory blocks in the first super blocks and in the same memory die; and
update the first mapping table based on the M first equilibrium read voltages; and
a host coupled to the memory system.

* * * * *